US011855828B2

(12) United States Patent
Bai et al.

(10) Patent No.: US 11,855,828 B2
(45) Date of Patent: Dec. 26, 2023

(54) LOW OVERHEAD TRACKING REFERENCE SIGNAL FOR FREQUENCY TRACKING

(71) Applicant: QUALCOMM Incorporated, San Diego, CA (US)

(72) Inventors: Tianyang Bai, Somerville, NJ (US); Junyi Li, Franklin Park, NJ (US); Wooseok Nam, San Diego, CA (US); Sungwoo Park, Seoul (KR); Kiran Venugopal, Raritan, NJ (US); Tao Luo, San Diego, CA (US); Jung Ho Ryu, Fort Lee, NJ (US); Qian Zhang, Basking Ridge, NJ (US); Ling Ding, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 17/302,578

(22) Filed: May 6, 2021

(65) Prior Publication Data

US 2021/0359892 A1 Nov. 18, 2021

Related U.S. Application Data

(60) Provisional application No. 63/023,592, filed on May 12, 2020.

(51) Int. Cl.
*H04L 27/26* (2006.01)
*H04W 72/0453* (2023.01)
*H04W 72/0446* (2023.01)
*H04L 5/00* (2006.01)

(52) U.S. Cl.
CPC ........ *H04L 27/2675* (2013.01); *H04L 5/0048* (2013.01); *H04W 72/0446* (2013.01); *H04W 72/0453* (2013.01)

(58) Field of Classification Search
CPC . H04L 27/2675; H04L 5/0048; H04L 5/0007; H04L 5/0041; H04L 27/2613; H04L 5/0094; H04W 72/0446; H04W 72/0453
See application file for complete search history.

(56) References Cited

U.S. PATENT DOCUMENTS

2019/0109750 A1* 4/2019 Nam .................... H04L 27/2662

FOREIGN PATENT DOCUMENTS

WO WO-2019067925 A1 4/2019

OTHER PUBLICATIONS

International Search Report and Written Opinion—PCT/US2021/070520—ISA/EPO—dated Jul. 16, 2021.

* cited by examiner

*Primary Examiner* — Dady Chery
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may determine a tracking reference signal (TRS) pattern to be used for receiving a TRS. The TRS pattern may indicate a plurality of TRS symbols of the TRS, one or more TRS symbols of the plurality of TRS symbols having a bandwidth that is different than a bandwidth of at least one other TRS symbol of the plurality of TRS symbols, or having a discontinuous tone allocation. The UE may receive the TRS based at least in part on the TRS pattern. Numerous other aspects are provided.

30 Claims, 16 Drawing Sheets

LOW OVERHEAD TRACKING REFERENCE SIGNAL FOR FREQUENCY TRACKING

CROSS-REFERENCE TO RELATED APPLICATION

This Patent Application claims priority to U.S. Provisional Patent Application No. 63/023,592, filed on May 12, 2020, entitled "LOW OVERHEAD TRACKING REFERENCE SIGNAL FOR FREQUENCY TRACKING," and assigned to the assignee hereof. The disclosure of the prior Applications is considered part of and is incorporated by reference into this Patent Application.

FIELD OF THE DISCLOSURE

Aspects of the present disclosure generally relate to wireless communication and specifically, to techniques and apparatuses for a low-overhead tracking reference signal (TRS) usable for improved frequency tracking.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In a wireless communication system, a base station may transmit multiple reference signals, one of which may be a tracking reference signal (TRS). A TRS is a reference signal that can be used by a UE to perform time tracking or frequency tracking. A conventional TRS may be problematic in some scenarios, such as a high mobility state (for example, when a UE is moving at large velocities such as when located on a high speed train). In such a scenario, a maximum Doppler shift may be near or even exceed a maximum pull-in range for carrier frequency offset estimation. Further, the frequency offset may be increased by one or more other factors (for example, a carrier frequency mismatch). A carrier frequency offset occurs when a local oscillator signal for down-conversion in a receiver does not synchronize with a carrier signal contained in a received signal. Carrier frequency estimation is a process for estimating the carrier frequency offset. In a scenario in which the Doppler shift or one or more other factors cause the frequency offset to be near or exceed the maximum pull-in range for carrier frequency offset estimation, a UE may not be able to reliable perform frequency tracking using the TRS.

SUMMARY

In some aspects, a method of wireless communication, performed by a user equipment, may include determining a tracking reference signal (TRS) pattern to be used for receiving a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation. The method performed by the user equipment may include receiving the TRS based at least in part on the TRS pattern.

In some aspects, a method of wireless communication, performed by a user equipment, may include determining a TRS pattern that is to be used for receiving a TRS, the TRS pattern being one of a plurality of configured TRS patterns, a frequency density of TRS symbols or a number of TRS tones in a first TRS pattern of the plurality of configured TRS patterns being less than a frequency density of TRS symbols or a number of TRS tones in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern. The method performed by the user equipment may include receiving the TRS based at least in part on the TRS pattern.

In some aspects, a method of wireless communication, performed by a base station, may include determining a TRS pattern to be used for transmitting a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation. The method performed by the base station may include transmitting the TRS based at least in part on the TRS pattern.

In some aspects, a method of wireless communication, performed by a base station, may include determining a TRS pattern that is to be used for transmitting a TRS, the TRS pattern being one of a plurality of configured TRS patterns, a frequency density of TRS symbols in a first TRS pattern of the plurality of configured TRS patterns being less than a frequency density of TRS symbols in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern. The method performed by the base station may include transmitting the TRS based at least in part on the TRS pattern.

In some aspects, a user equipment for wireless communication may include at least one processor and at least one memory communicatively coupled with the at least one processor and storing processor-readable code. The processor-readable code, when executed by the at least one processor, may be configured to cause the UE to determine a TRS pattern to be used for receiving a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation. The memory and the one or more processors may be configured to receive the TRS based at least in part on the TRS pattern.

In some aspects, a user equipment for wireless communication may include at least one processor and at least one memory communicatively coupled with the at least one processor and storing processor-readable code. The processor-readable code, when executed by the at least one processor, may be configured to cause the UE to determine a TRS pattern that is to be used for receiving a TRS, the TRS pattern being one of a plurality of configured TRS patterns, a frequency density of TRS symbols or a number of TRS tones in a first TRS pattern of the plurality of configured TRS patterns being less than a frequency density of TRS symbols or a number of TRS tones in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern. The memory and the one or more processors may be configured to receive the TRS based at least in part on the TRS pattern.

In some aspects, a base station for wireless communication may include at least one processor and at least one memory communicatively coupled with the at least one processor and storing processor-readable code. The processor-readable code, when executed by the at least one processor, may be configured to cause the base station to determine a TRS pattern to be used for transmitting a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation. The memory and the one or more processors may be configured to transmit the TRS based at least in part on the TRS pattern.

In some aspects, a base station for wireless communication may include at least one processor and at least one memory communicatively coupled with the at least one processor and storing processor-readable code. The processor-readable code, when executed by the at least one processor, may be configured to cause the base station to determine a TRS pattern that is to be used for transmitting a TRS, the TRS pattern being one of a plurality of configured TRS patterns, a frequency density of TRS symbols in a first TRS pattern of the plurality of configured TRS patterns being less than a frequency density of TRS symbols in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern. The memory and the one or more processors may be configured to transmit the TRS based at least in part on the TRS pattern.

In some aspects, a non-transitory computer-readable medium may store one or more instructions for wireless communication. The one or more instructions, when executed by one or more processors of a user equipment, may cause the one or more processors to determine a TRS pattern to be used for receiving a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation. The one or more instructions may cause the one or more processors to receive the TRS based at least in part on the TRS pattern.

In some aspects, a non-transitory computer-readable medium may store one or more instructions for wireless communication. The one or more instructions, when executed by one or more processors of a user equipment, may cause the one or more processors to determine a TRS pattern that is to be used for receiving a TRS, the TRS pattern being one of a plurality of configured TRS patterns, a frequency density of TRS symbols or a number of TRS tones in a first TRS pattern of the plurality of configured TRS patterns being less than a frequency density of TRS symbols or a number of TRS tones in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern. The one or more instructions may cause the one or more processors to receive the TRS based at least in part on the TRS pattern.

In some aspects, a non-transitory computer-readable medium may store one or more instructions for wireless communication. The one or more instructions, when executed by one or more processors of a base station, may cause the one or more processors to determine a TRS pattern to be used for transmitting a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation. The one or more instructions may cause the one or more processors to transmit the TRS based at least in part on the TRS pattern.

In some aspects, a non-transitory computer-readable medium may store one or more instructions for wireless communication. The one or more instructions, when executed by one or more processors of a base station, may cause the one or more processors to determine a TRS pattern that is to be used for transmitting a TRS, the TRS pattern being one of a plurality of configured TRS patterns, a frequency density of TRS symbols in a first TRS pattern of the plurality of configured TRS patterns being less than a frequency density of TRS symbols in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern. The one or more instructions may cause the one or more processors to transmit the TRS based at least in part on the TRS pattern.

In some aspects, an apparatus for wireless communication may include means for determining a TRS pattern to be used for receiving a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation. The apparatus may include means for receiving the TRS based at least in part on the TRS pattern.

In some aspects, an apparatus for wireless communication may include means for determining a TRS pattern that is to be used for receiving a TRS, the TRS pattern being one of a plurality of configured TRS patterns, a frequency density of TRS symbols or a number of TRS tones in a first TRS pattern of the plurality of configured TRS patterns being less than a frequency density of TRS symbols or a number of TRS tones in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern. The apparatus may include means for receiving the TRS based at least in part on the TRS pattern.

In some aspects, an apparatus for wireless communication may include means for determining a TRS pattern to be used for transmitting a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation. The apparatus may include means for transmitting the TRS based at least in part on the TRS pattern.

In some aspects, an apparatus for wireless communication may include means for determining a TRS pattern that is to be used for transmitting a TRS, the TRS pattern being one of a plurality of configured TRS patterns, a frequency density of TRS symbols in a first TRS pattern of the plurality of configured TRS patterns being less than a frequency density of TRS symbols in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern. The apparatus may include means for transmitting the TRS based at least in part on the TRS pattern.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
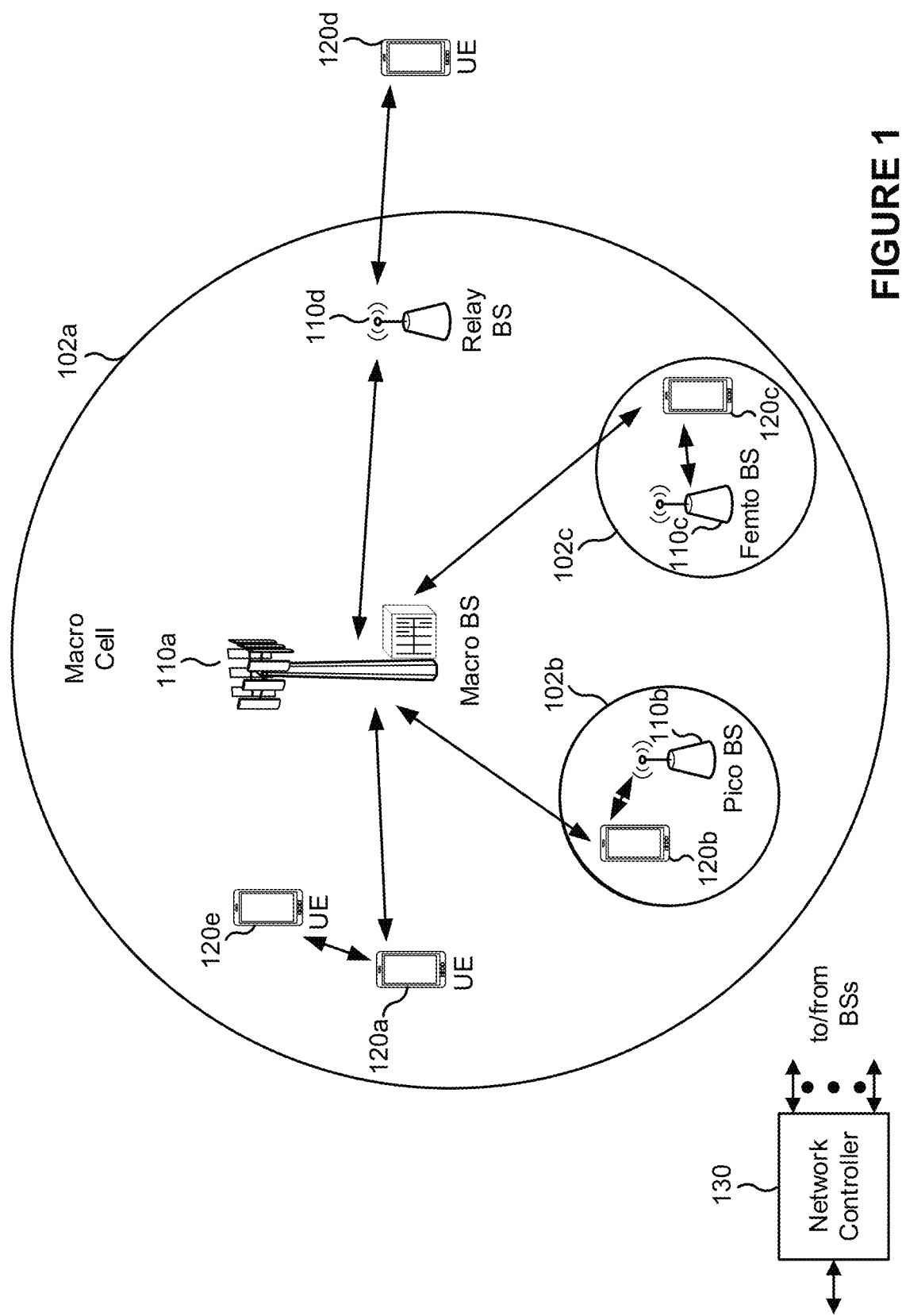
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A conventional tracking reference signal (TRS) may be problematic in some scenarios, such as a high mobility state (for example, when a UE is moving at large velocities such as when located on a high speed train). In such a scenario, a maximum Doppler shift may be near or even exceed a maximum pull-in range for carrier frequency offset estimation. Further, the frequency offset may be increased by one or more other factors (for example, a carrier frequency mismatch). In such a scenario, a UE may not be able to reliably perform frequency tracking using the TRS.

Various aspects relate generally to a low-overhead TRS for improved frequency tracking. Some aspects more specifically relate to a TRS that includes one or more TRS symbols having a bandwidth that is different than a bandwidth of at least one other TRS symbol of the TRS. Some aspects more specifically relate to a TRS including one or more TRS symbols that have a discontinuous tone allocation. Some aspects more specifically relate to a TRS having a TRS pattern (for example, a first TRS pattern configured on the UE) in which a frequency density of TRS symbols or a number of TRS tones in the TRS pattern is less than a frequency density of TRS symbols or a number of TRS tones in another TRS pattern (for example, a second TRS pattern configured on the UE), and in which a time density of the TRS symbols of the TRS pattern is greater than a time density of the TRS symbols in the other TRS pattern. In some examples, the described techniques can be used to enable improved frequency tracking using a TRS without significantly increasing TRS signaling overhead.

FIG. 1 is a diagram illustrating an example of a wireless network in accordance with the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/ sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
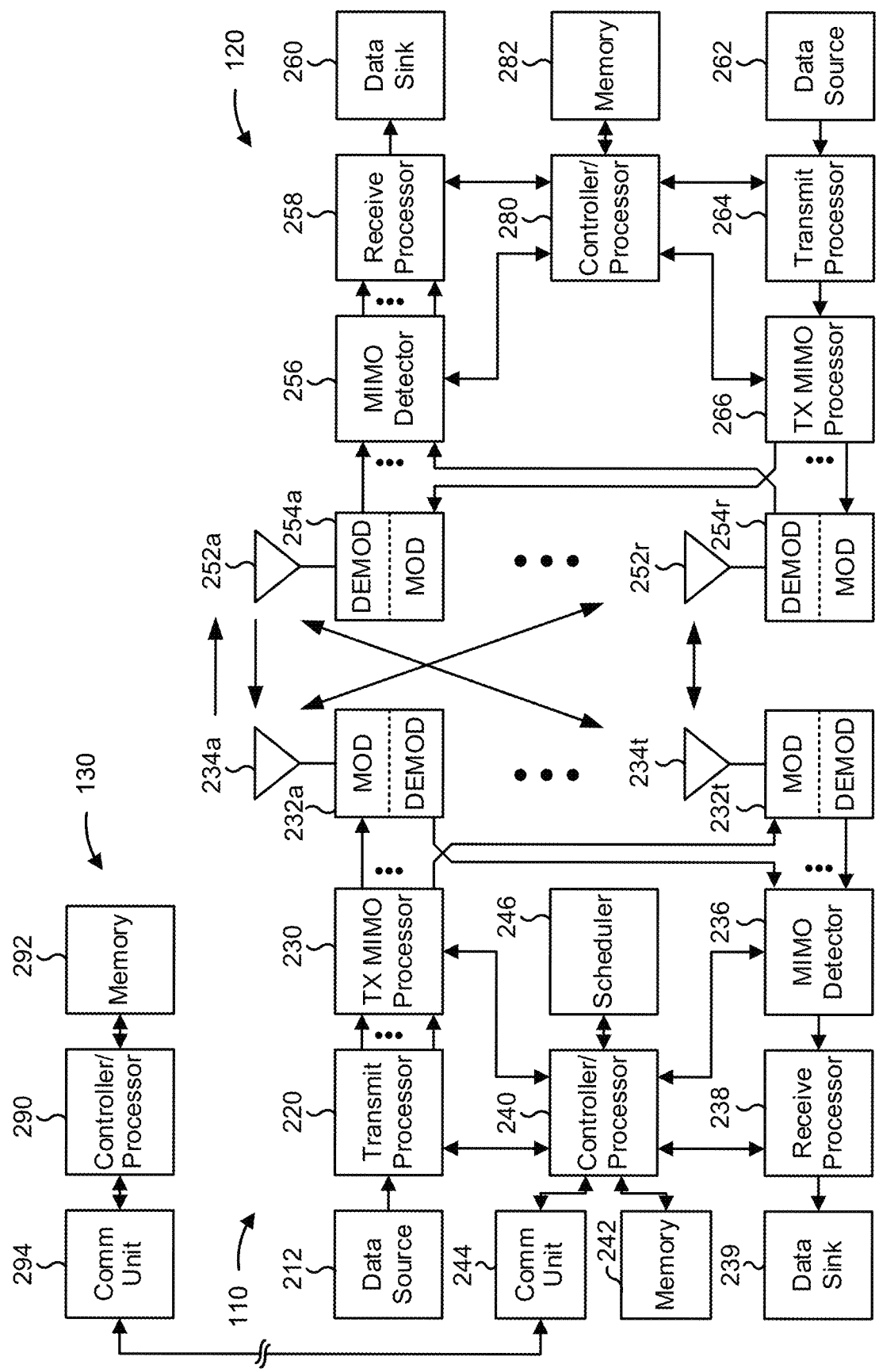
FIG. 2 is a diagram illustrating an example base station (BS) in communication with a user equipment (UE) in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234*a* through 234*t* or antennas 252*a* through 252*r*) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254*a* through 254*r* (for example, for discrete Fourier transform spread orthogonal frequency division multiplexing (DFT-s-OFDM) or a CP-OFDM), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with a low-overhead TRS for frequency tracking, as described in more detail elsewhere herein. For example, controller/processor 240 of base station 110, controller/processor 280 of UE 120, or any other component(s) of FIG. 2 may perform or direct operations of, for example, process 600 of FIG. 6, process 700 of FIG. 7, process 800 of FIG. 8, process 900 of FIG. 9, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, process 700 of FIG. 7, process 800 of FIG. 8, process 900 of FIG. 9, or other processes as described herein. In some aspects, executing instructions may include running the instructions, converting the instructions, compiling the instructions, or interpreting the instructions, among other examples.

In some aspects, UE 120 may include means for determining a TRS pattern to be used for receiving a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, a discontinuous tone allocation; means for receiving the TRS based at least in part on the TRS pattern; among other examples, or combinations thereof. In some aspects, such means may include one or more components of UE 120 described in connection with FIG. 2.

In some aspects, UE 120 may include means for determining a TRS pattern that is to be used for receiving a TRS, the TRS pattern being one of a plurality of configured TRS patterns, a frequency density of TRS symbols or a number of TRS tones in a first TRS pattern of the plurality of configured TRS patterns being less than a frequency density of TRS symbols or a number of TRS tones in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern; means for receiving the TRS based at least in part on the TRS pattern; among other examples, or combinations thereof. In some aspects, such means may include one or more components of UE 120 described in connection with FIG. 2.

In some aspects, base station 110 may include means for determining a TRS pattern to be used for transmitting a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation; means for transmitting the TRS based at least in part on the TRS pattern; among other examples, or combinations thereof. In some aspects, such means may include one or more components of base station 110 described in connection with FIG. 2.

In some aspects, base station 110 may include means for determining a TRS pattern that is to be used for transmitting a TRS, the TRS pattern being one of a plurality of configured TRS patterns, a frequency density of TRS symbols in a first TRS pattern of the plurality of configured TRS patterns being less than a frequency density of TRS symbols in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern; means for transmitting the TRS based at least in part on the TRS pattern; among other examples, or combinations thereof. In some aspects, such means may include one or more components of base station 110 described in connection with FIG. 2.

Figure 3:
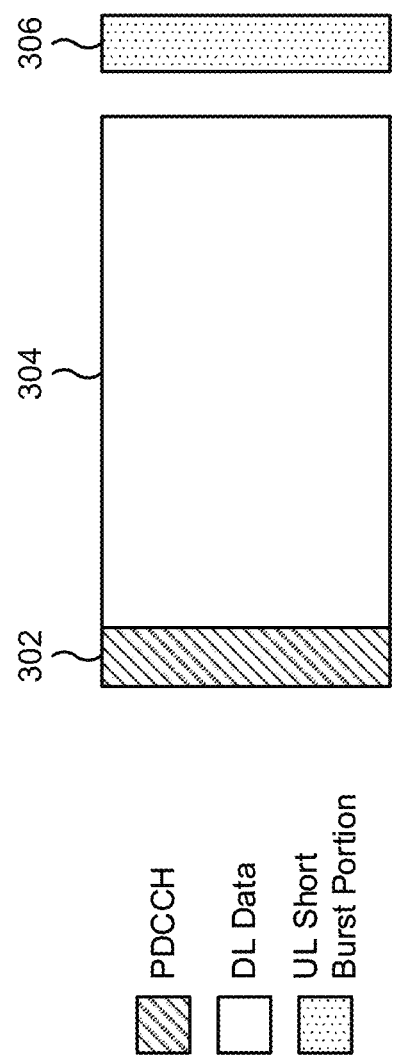
FIG. 3 is a diagram showing an example downlink-centric slot or communication structure in accordance with the present disclosure.

FIG. 3 is a diagram showing an example downlink (DL)-centric slot or communication structure in accordance with the present disclosure. The DL-centric slot (or wireless communication structure) may include a control portion 302 during which the scheduling entity (for example, UE or BS) transmits various scheduling information or control information corresponding to various portions of the DL-centric slot to the subordinate entity (for example, UE). The control portion 302 may exist in the initial or beginning portion of the DL-centric slot. In some configurations, the control portion 302 may be a physical DL control channel physical downlink control channel (PDCCH), as indicated in FIG. 3. In some aspects, the control portion 302 may include legacy PDCCH information, shortened PDCCH (sPDCCH) information), a control format indicator (CFI) value (for example, carried on a physical control format indicator channel (PCFICH)), one or more grants (for example, downlink grants, or uplink grants), among other examples, or combinations thereof.

The DL-centric slot may also include a DL data portion 304 during which the scheduling entity (for example, UE or BS) transmits DL data to the subordinate entity (for example, UE) using communication resources utilized to communicate DL data. The DL data portion 304 may sometimes be referred to as the payload of the DL-centric slot. In some configurations, the DL data portion 304 may be a physical downlink shared channel (PDSCH).

The DL-centric slot may also include an UL short burst portion 306 during which the subordinate entity (for example, UE) transmits reference signals or feedback to the scheduling entity (for example, UE or BS) using communication resources utilized to communicate UL data. The UL short burst portion 306 may sometimes be referred to as an UL burst, an UL burst portion, a common UL burst, a short burst, an UL short burst, a common UL short burst, a common UL short burst portion, or various other suitable terms. In some aspects, the UL short burst portion 306 may include one or more reference signals. Additionally or alternatively, the UL short burst portion 306 may include feedback information corresponding to various other portions of the DL-centric slot. For example, the UL short burst portion 306 may include feedback information corresponding to the control portion 302 or the data portion 304. Non-limiting examples of information that may be included in the UL short burst portion 306 include an acknowledgement (ACK) signal (for example, a physical uplink control channel (PUCCH) ACK, a physical uplink shared channel (PUSCH) ACK, or an immediate ACK), a negative acknowledgement (NACK) signal (for example, a PUCCH NACK, a PUSCH NACK, or an immediate NACK), a scheduling request (SR), a buffer status report (BSR), a hybrid automatic repeat request (HARD) indicator, a channel state information (CSI), a CQI, a sounding reference signal (SRS), a demodulation reference signal (DMRS), PUSCH data, or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, or various other suitable terms. This separation provides time for the switch-over from DL communication (for example, reception operation by the subordinate entity (for example, BS or UE)) to UL communication (for example, transmission by the subordinate entity (for example, UE)). The foregoing provides some examples of a DL-centric wireless communication structure, but alternative structures having similar features may exist without deviating from the aspects described herein.

Figure 4:
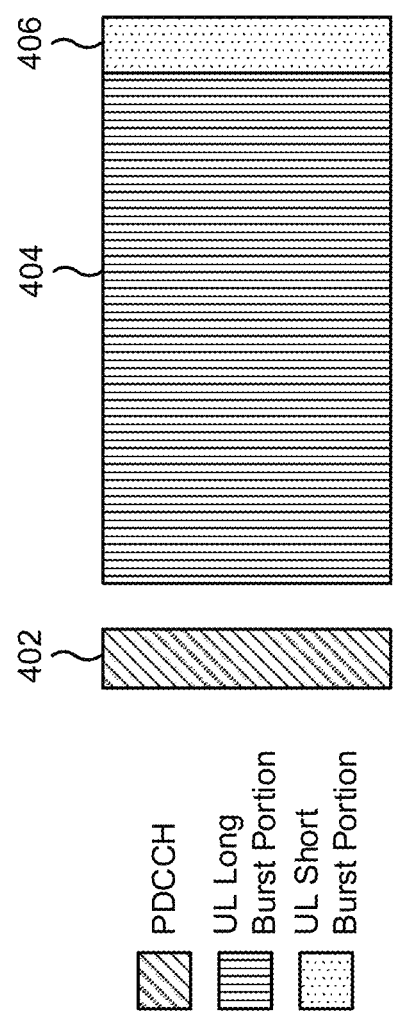
FIG. 4 is a diagram showing an example uplink-centric slot or communication structure in accordance with the present disclosure.

FIG. 4 is a diagram showing an example uplink (UL)-centric slot or communication structure in accordance with the present disclosure. The UL-centric slot (or wireless communication structure) may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. The UL portion may refer to the communication resources utilized to communicate UL data from the subordinate entity (for example, UE) to the scheduling entity (for example, UE or BS). In some configurations, the control portion 402 may be a physical DL control channel PDCCH.

As illustrated in FIG. 4, the end of the control portion 402 may be separated in time from the beginning of the UL long burst portion 404. This time separation may sometimes be referred to as a gap, guard period, guard interval, or various other suitable terms. This separation provides time for the switch-over from DL communication (for example, reception operation by the scheduling entity) to UL communication (for example, transmission operation by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is merely one example of an UL-centric wireless communication structure, and alternative structures having similar features may exist without deviating from the aspects described herein.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

In a wireless communications system, such as an NR system, a base station (for example, a base station 110) may transmit a TRS for reception by one or more UEs (for example, one or more UEs 120). A UE may use the TRS to perform time tracking or frequency tracking. Conventionally, the TRS is a wideband signal and is transmitted in periodic bursts. The TRS can be configured as a channel state information reference signal (CSI-RS) resource set. A UE in radio resource control (RRC) connected mode may expect to receive a UE-specific RRC configuration of a TRS. However, while a TRS is UE-specifically managed, in some scenarios a base station may configure multiple UEs with the same TRS. In such scenarios, the sharing of the TRS is transparent to the multiple UEs.

There are several parameters associated with a configuration of a TRS. One parameter associated with a TRS includes a length of a TRS burst. In an NR system, for example, the length of the TRS burst can be configured to be two slots for sub-6 gigahertz (GHz) frequencies, and one slot or two slots for frequencies at or above 6 GHz. Another parameter associated with a TRS includes a TRS burst periodicity. In an NR system, for example, the periodicity of the TRS burst can be configured as 10 milliseconds (ms), 20 ms, 40 ms, or 80 ms for both sub-6 GHz frequencies and frequencies at or above 6 GHz. Another parameter associated with a TRS is a number of TRS symbols within a slot. In an NR system, for example, the number of TRS symbols within a slot can be configured to be two TRS symbols for both sub-6 GHz frequencies and frequencies at or above 6 GHz. Another parameter associated with a TRS includes a TRS bandwidth. In an NR system, for example, the TRS bandwidth can be configured to be approximately 50 resource blocks (RBs) for both sub-6 GHz frequencies and frequencies at or above 6 GHz. Another parameter associated with a TRS includes a TRS subcarrier spacing index value. In an NR system, for example, the TRS subcarrier spacing index value is configured to be 4 for both sub-6 GHz frequencies and frequencies at or above 6 GHz. Another parameter associated with a TRS includes a TRS symbol spacing with a slot. In an NR system, for example, the TRS symbol spacing within a slot can be configured to be four symbols for both sub-6 GHz frequencies and frequencies at or above 6 GHz. Positions of TRS symbols per slot can be configured by RRC signaling. In an NR system, for example, the possible symbol positions per slot can be symbol 4 and symbol 8, symbol 5 and symbol 9, or symbol 6 and symbol 10 (for example, two TRS symbols per slot with a spacing of four symbols). TRS resources in each slot of a TRS burst typically have the same symbol position.

A TRS that uses the parameters described above may be problematic in some scenarios, such as a high mobility state (for example, when a UE is moving at large velocities such as when located on a high speed train). For example, at a carrier frequency of 30 GHz, a maximum Doppler shift at a speed of 500 kilometers per hour (km/h) is approximately 13.9 kilohertz (kHz). The Doppler shift can be even higher at higher carrier frequencies. Further, an actual frequency offset can be higher due to one or more other factors, such as a carrier frequency mismatch between a transmitter and a receiver. A maximum pull-in range for carrier frequency offset estimation is defined by an interval between TRS symbols. For a conventional TRS pattern in an NR system such as that described above, and taking a subcarrier spacing of 120 kHz as an example, the maximum pull-in range is 14 kHz. Thus, in some scenarios, the maximum Doppler shift may be near or even exceed the maximum pull-in range. If the Doppler shift exceeds the maximum pull-in range for carrier frequency offset estimation, then the UE may not be able to reliably perform frequency tracking.

Some techniques for improving frequency tracking in a high mobility state involve increasing a density of a pattern of TRS symbols in the time domain (in other words, decrease a TRS symbol interval). However, increasing the density of the pattern of TRS symbols in the time domain may increase the overhead associated with transmitting a TRS by an undesirable amount (for example, because the TRS is a wideband signal).

In various scenarios, a wideband TRS may be needed to enable time tracking at the UE. However, for frequency tracking at the UE, a large TRS bandwidth is not generally needed. Rather, a smaller interval of time between TRS symbols is useful for improving frequency tracking. Thus, the primary purpose of a TRS having a comparatively higher time density may be for enabling frequency tracking, meaning that a large bandwidth for all TRS symbols of the TRS may not be needed.

Various aspects relate generally to a low-overhead TRS for improved frequency tracking. Some aspects more specifically relate to a TRS that includes one or more TRS symbols having a bandwidth that is different than a bandwidth of at least one other TRS symbol of the TRS. Some aspects more specifically relate to a TRS including one or more TRS symbols that have a discontinuous tone allocation. Some aspects more specifically relate to a TRS having a TRS pattern (for example, a first TRS pattern configured on the UE) in which a frequency density of TRS symbols or a number of TRS tones in the TRS pattern is less than a frequency density of TRS symbols or a number of TRS tones in another TRS pattern (for example, a second TRS pattern configured on the UE), and in which a time density of the TRS symbols of the TRS pattern is greater than a time density of the TRS symbols in the other TRS pattern. In some examples, the described techniques can be used to enable improved frequency tracking using a TRS, without significantly increasing TRS signaling overhead. Additional details are provided below.

Figure 5A:
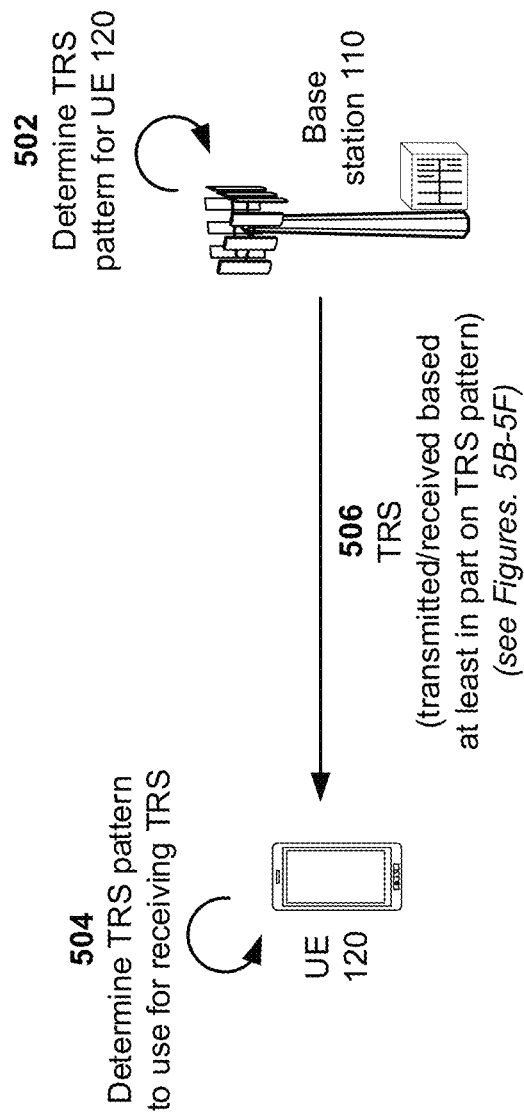
FIGS. 5A-5F are diagrams illustrating examples associated with a low-overhead tracking reference signal (TRS) for frequency tracking, in accordance with the present disclosure.

FIGS. 5A-5F are diagrams illustrating examples associated with a low-overhead TRS for frequency tracking, in accordance with the present disclosure. Example operations identified in FIG. 5A are described below, followed by descriptions of example of low-overhead TRS patterns for improved frequency tracking shown in FIGS. 5B-5F.

As shown in FIG. 5A, in a first operation 502, a base station (for example, a base station 110) may select, identify or otherwise determine a TRS pattern to be used for transmitting a TRS to a UE (for example, a UE 120). In some aspects, the base station may determine the TRS pattern in operation 502 based at least in part on capability information indicating whether the UE is capable of receiving TRS patterns with TRS symbols having different bandwidths or TRS symbols with discontinuous tone allocations. For example, the UE may transmit, and the base station may receive, capability information indicating whether the UE is capable of receiving TRS patterns with TRS symbols having different bandwidths or TRS symbols with discontinuous tone allocations. In such examples, the base station may determine a TRS pattern based at least in part on the capability information associated with the UE. For example, if the UE is capable of receiving TRS patterns with TRS symbols having different bandwidths or TRS symbols with discontinuous tone allocations, then the base station may determine, in operation 502, that a low-overhead TRS pattern for improved frequency tracking should be used for transmitting a TRS to the UE and transmit the TRS based on the low-overhead TRS pattern accordingly. Alternatively, if the UE is not capable of receiving TRS patterns with TRS symbols having different bandwidths or TRS symbols with discontinuous tone allocations, then the base station may determine, in operation 502, that a conventional TRS pattern should be used for transmitting the TRS to the UE and transmit the TRS based on the conventional TRS pattern accordingly.

Additionally or alternatively, in some aspects, the base station may determine the TRS pattern based at least in part on a determination as to whether the UE is operating in high mobility state. For example, the base station may determine (for example, based at least in part on location or speed information provided by the UE) that the UE is in a high mobility state (for example, is located on a high speed train) and may determine that a low-overhead TRS pattern for improved frequency tracking is to be used for transmitting the TRS to the UE.

Additionally or alternatively, in some aspects, the base station may determine the TRS pattern in operation 502 based at least in part on information that identifies a TRS pattern preferred by the UE. For example, the UE may transmit, and the base station may receive, a request for the TRS pattern. In some aspects, the request from the UE may indicate a preferred TRS pattern. In some examples, the UE may determine that a low-overhead TRS pattern for improved frequency tracking is needed or advantageous based at least in part on an estimation of a speed of the UE. In some such examples, the base station may select (as the determined pattern) the TRS pattern indicated as preferred by the UE in operation 502.

In some other aspects, the base station may determine the TRS pattern in operation 502 based at least in part on the TRS pattern being preconfigured on the base station (for example, according to a wireless communication standard).

In a second operation 504, the UE may select, identify or otherwise determine the TRS pattern to be used for receiving the TRS. In some aspects, the UE may determine the TRS pattern in operation 504 based at least in part on receiving information associated with the TRS pattern from the base station. For example, the base station may determine the TRS pattern to be used to transmit the TRS to the UE, as described above, and may transmit information indicating or associated with the TRS pattern to the UE. In such examples, the UE may receive the information indicating or associated with the TRS pattern from the UE, and may determine the TRS pattern in operation 504 based at least in part on receiving the information from the base station. In some aspects, as described above, the base station may transmit, and the UE may receive, the information indicating or associated with the TRS pattern based at least in part on a request transmitted by the UE to the base station (for example, a request including an indication of a preferred TRS pattern).

Additionally or alternatively, in some aspects, the UE may determine the TRS pattern in operation 504 based at least in part on an indication transmitted by the base station. For example, in some aspects, the UE may be configured (for example, by the base station, or by preconfiguration according to a wireless communication standard) with multiple TRS patterns (for example, a first TRS pattern associated with enabling frequency tracking, a second TRS pattern associated with enabling time tracking, or the like). Here, the base station may transmit, and the UE may receive, an indication identifying one of the multiple TRS patterns as the TRS pattern to be used by the UE. The UE may receive the indication and determine the TRS pattern in operation 504 based at least in part on the indication. In some aspects, the base station may transmit, and the UE may receive, the configuration associated with the multiple TRS patterns via, for example, RRC signaling). In some aspects, the base station may transmit, and the UE may receive, the indication associated with identifying one of the configured TRS patterns via, for example, downlink control information (DCI), a medium access control (MAC) control element, or the like.

In some other aspects, the UE may determine the TRS pattern based at least in part on the TRS pattern being preconfigured on the UE (for example, according to a wireless communication standard).

In a third operation 506, the base station may transmit, and the UE may receive, the TRS according to the TRS pattern. That is, the base station may transmit the TRS in operation 506 based at least in part on the TRS pattern determined in operation 502 to be used for transmitting the TRS, and the UE may receive the TRS based at least in part on the (same) TRS pattern it determined in operation 504 to be used for receiving the TRS.

FIGS. 5B-5F are diagrams of example low-overhead TRS for improved frequency tracking, in accordance with the present disclosure. In some aspects, as illustrated in FIGS. 5B-5E, the TRS pattern (for example, determined by the base station and the UE in the manner described in association with FIG. 5A) includes at least three TRS symbols.

Figure 5B:
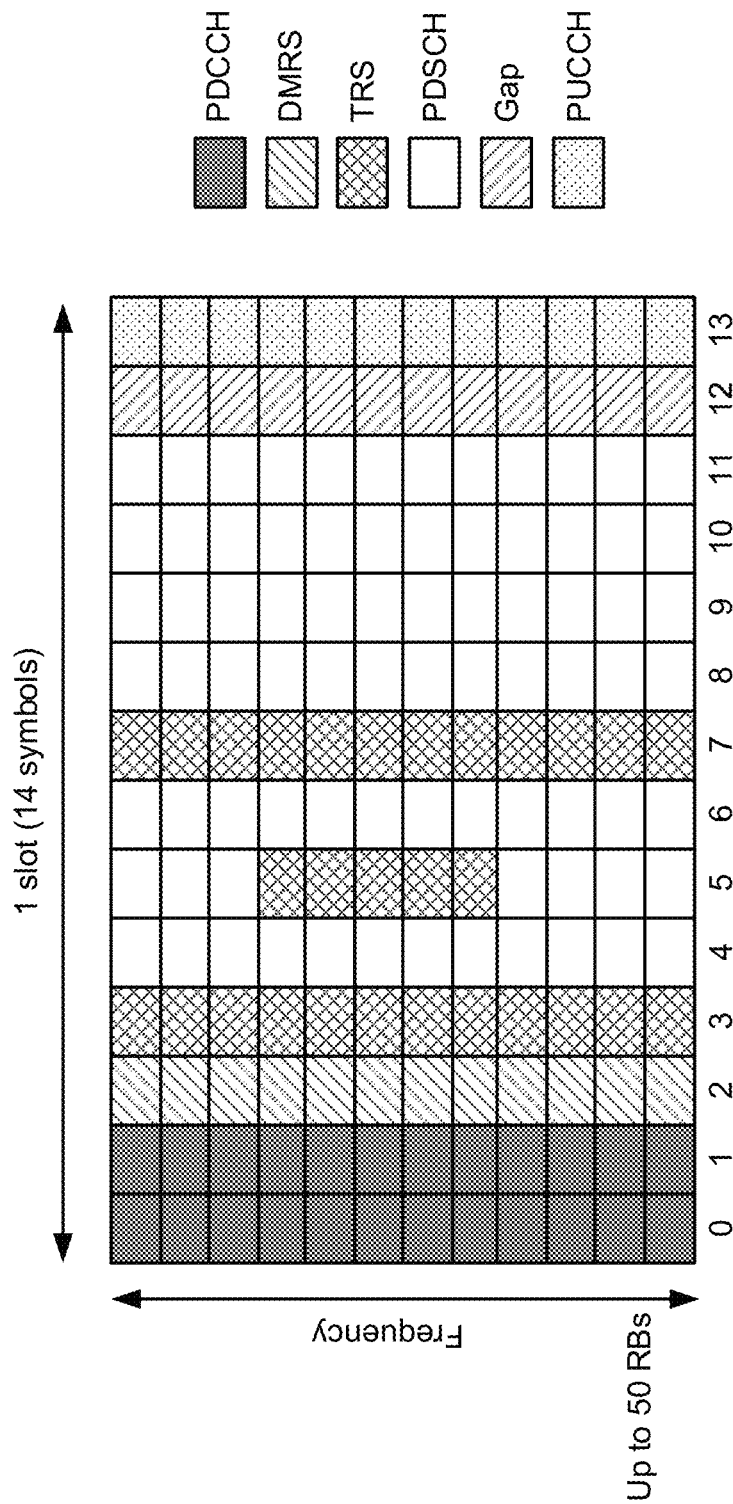

In some aspects, the TRS pattern indicates multiple TRS symbols of the TRS, where one or more TRS symbols of the multiple TRS symbols have a bandwidth that is different than a bandwidth of at least one other TRS symbol of the multiple TRS symbols. That is, in some aspects, at least two TRS symbols in a given slot may have different bandwidths. A particular example of a TRS pattern having TRS symbols with different bandwidths is shown in FIG. 5B. In the example shown in FIG. 5B, each rectangle may represent an RB or a resource element (RE).

In FIG. 5B, a first TRS symbol (in symbol 3) has a first bandwidth (for example, 50 RBs), a second TRS symbol (in symbol 5) has a second bandwidth (for example, a bandwidth smaller than the first bandwidth), and a third TRS symbol (in symbol 7) has the first bandwidth. In this example, the first and third TRS symbols can be used for time tracking (for example, because the first and third TRS symbols are wideband) or for frequency tracking, and the second TRS symbol can be used to improve a frequency tracking range associated with the TRS (for example, because the inclusion of the second TRS symbol provides a reduced time interval between individual TRS symbols in the slot as compared to a slot including only the first and third TRS symbols).

In some aspects, the TRS pattern indicates that a TRS symbol with a comparatively smaller bandwidth is between, before, or after at least two symbols with comparatively wider bandwidths in the time domain. For example, in FIG. 5B, the second TRS symbol (in other words, the TRS symbol with the comparatively smaller bandwidth) is between the first TRS symbol and the third TRS symbol in the time domain. In another example, the second TRS symbol may be before the first TRS symbol and the third TRS symbol in the time domain. In yet another example the second TRS symbol may be after the first TRS symbol and the third TRS symbol in the time domain.

Figure 5C:
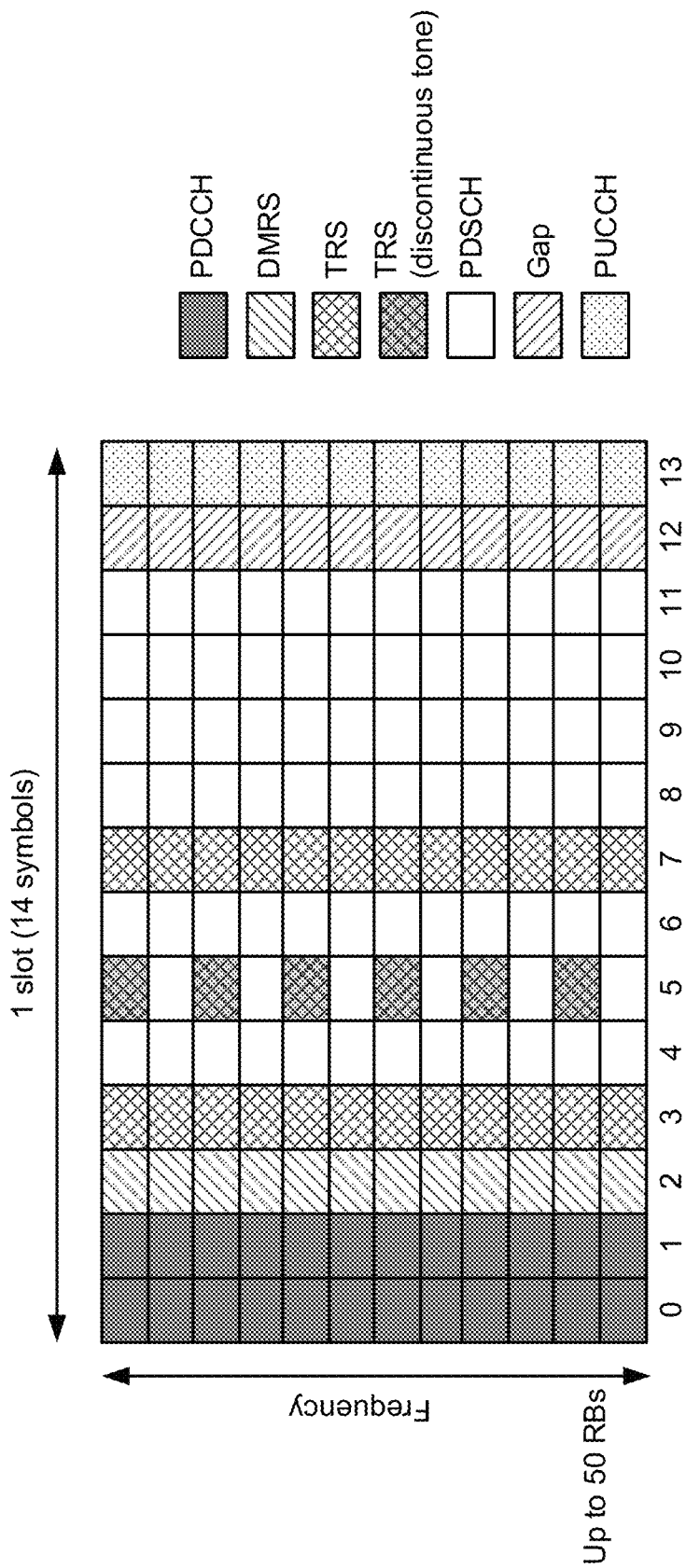

In some aspects, the TRS pattern indicates multiple TRS symbols of the TRS, and one or more TRS symbols of the multiple TRS symbols have a discontinuous tone allocation. That is, in some aspects, in at least one TRS symbol, TRS tones are not continuously allocated across the bandwidth. For example, the tone allocation across the bandwidth may alternate RBs of the bandwidth (for example, such that a tones in a first RB are allocated, tones in a second RB are not allocated, tones in a third RB are allocated, tones in a fourth RB are not allocated, and so on), may alternate REs of the bandwidth (for example, such that a tones in a first RE are allocated, tones in a second RE are not allocated, tones in a third RE are allocated, tones in a fourth RB are not allocated, and so on), or the like. A particular example of a TRS pattern having one or more TRS symbols with a discontinuous tone allocation is shown in FIG. 5C. In the example shown in FIG. 5C each rectangle may represent an RB or an RE.

In FIG. 5C, a first TRS symbol (in symbol 3) has a continuous tone allocation (for example, across 50 RBs), a second TRS symbol (in symbol 5) has a discontinuous tone allocation (for example, across 50 RBs), and a third TRS symbol (in symbol 7) has a continuous tone allocation (for example, across 50 RBs). In this example, the first and third TRS symbols can be used for time tracking (for example, because the first and third TRS symbols are wideband) and frequency tracking, and the second TRS symbol can be used to improve a frequency tracking range associated with the TRS (for example, because the inclusion of the second TRS symbol provides a reduced time interval between individual TRS symbols in the slot as compared to a slot including only the first and third TRS symbols).

In some aspects, the TRS pattern indicates that a TRS symbol with a discontinuous tone allocation is between, before, or after at least two symbols with continuous tone allocations in the time domain. For example, in FIG. 5C, the second TRS symbol (in other words, the TRS symbol with the discontinuous tone allocation) is between the first TRS symbol and the third TRS symbol in the time domain. In another example, the second TRS symbol may be before the first TRS symbol and the third TRS symbol in the time domain. In yet another example the second TRS symbol may be after the first TRS symbol and the third TRS symbol in the time domain.

In some aspects, the TRS pattern may indicate that each TRS symbol of the multiple TRS symbols has a discontinuous tone allocation. That is, in some aspects, all TRS symbols may have a discontinuous allocation. In some other aspects, discontinuous tone allocations may be used for a TRS pattern with a TRS burst length of less than three slots. Thus, in some such aspects, a length of a TRS burst, associated with the TRS, is less than three slots. Additionally or alternatively, in some aspects, discontinuous tone allocations may be used for a TRS symbol not supported in a legacy TRS pattern. That is, in some aspects, the one or more TRS symbols with the discontinuous tone allocations may include at least one non-legacy TRS symbol (for example, symbol 5 in FIG. 5C).

Figure 5D:
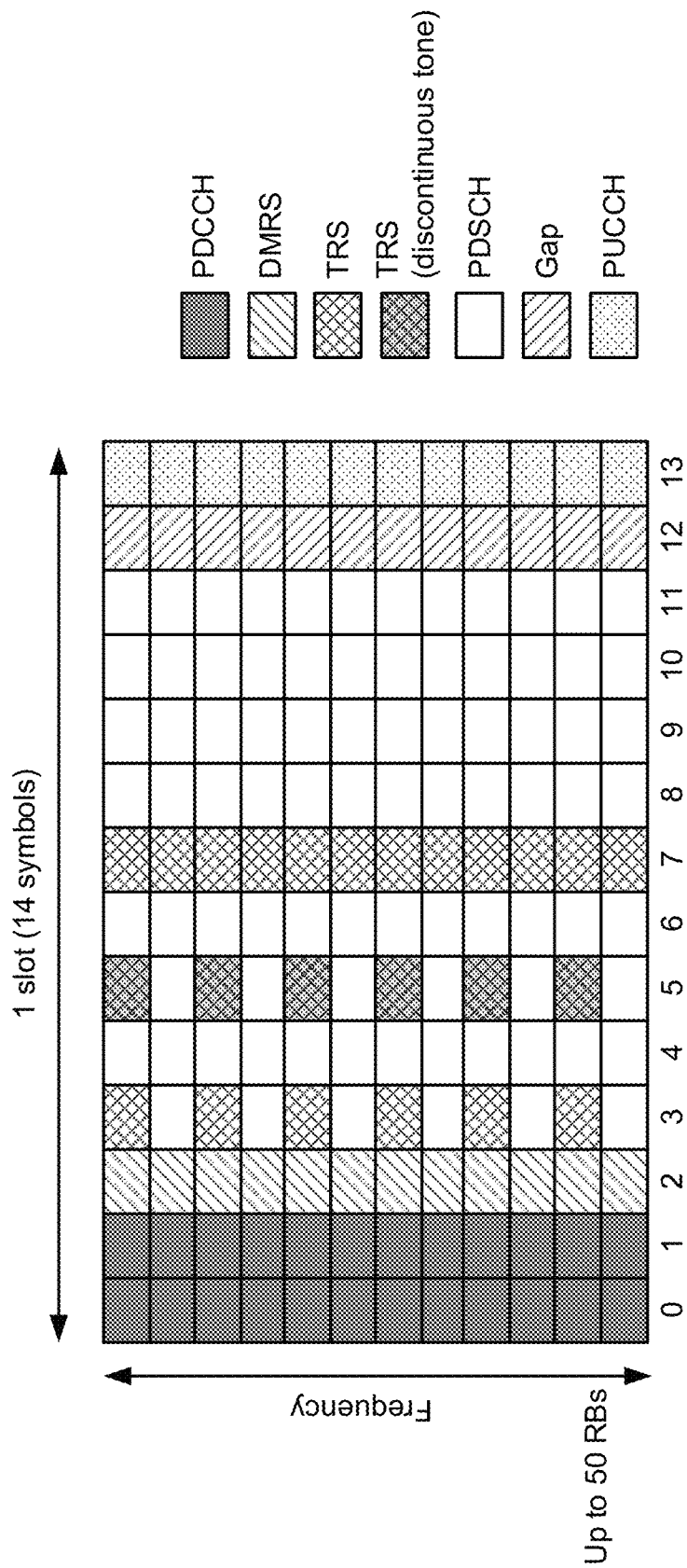

In some aspects, a tone allocation of a first TRS symbol in a given slot of the TRS pattern may be different than a tone allocation of a second TRS symbol of the given slot of the TRS pattern. In some aspects, the tone allocation of the first TRS symbol may at least partially overlap the tone allocation of the second TRS symbol. That is, in some aspects, different TRS symbols in a slot can have different tone allocations and, in some aspects, the allocated tones of different symbols at least partially overlap. In such aspects, if one or more TRS symbols have a comparatively larger bandwidth and continuous tone allocation and one or more other TRS symbols have a comparatively smaller bandwidth and discontinuous tone allocation, then the TRS symbols having the comparatively larger bandwidth and continuous tone allocation may include the tones for the TRS symbols having the comparatively smaller bandwidth and discontinuous tone allocation. In some aspects, such a configuration may reduce complexity of phase change and frequency offset computations (for example, as compared to using equalized TRS symbols at the same tone of different symbols). A particular example of a TRS pattern in which different TRS symbols in a slot have different tone allocations is shown in FIG. 5D. In FIG. 5D, tones of TRS symbol 7, which has a first bandwidth (a comparatively larger bandwidth) and continuous tone allocation, overlap tones of TRS symbol 5, which as a second bandwidth (a comparatively smaller bandwidth) and discontinuous tone allocation. Further, tones of TRS symbol 3, which has the second bandwidth and continuous tone allocation, overlap the tones of TRS symbol 5. In the example shown in FIG. 5D each rectangle may represent an RB or an RE.

In some aspects, as described above, the TRS pattern selected by the base station and identified by the UE may be one of multiple configured TRS patterns. For example, the UE may be configured (for example, by the base station, according to a wireless communication standard, or the like) with a first TRS pattern and a second TRS pattern. In some aspects, a frequency density of TRS symbols or a number of TRS tones in the first TRS pattern may be different than a frequency density of TRS symbols or a number of TRS tones in the second TRS pattern, and a time density of the TRS symbols of the first TRS pattern may be different than a time density of the TRS symbols in the second TRS pattern. In this example, the TRS pattern used for the TRS may be either the first TRS pattern or the second TRS pattern (for example, as determined by the base station and the UE in the manner described above).

Figure 5E:
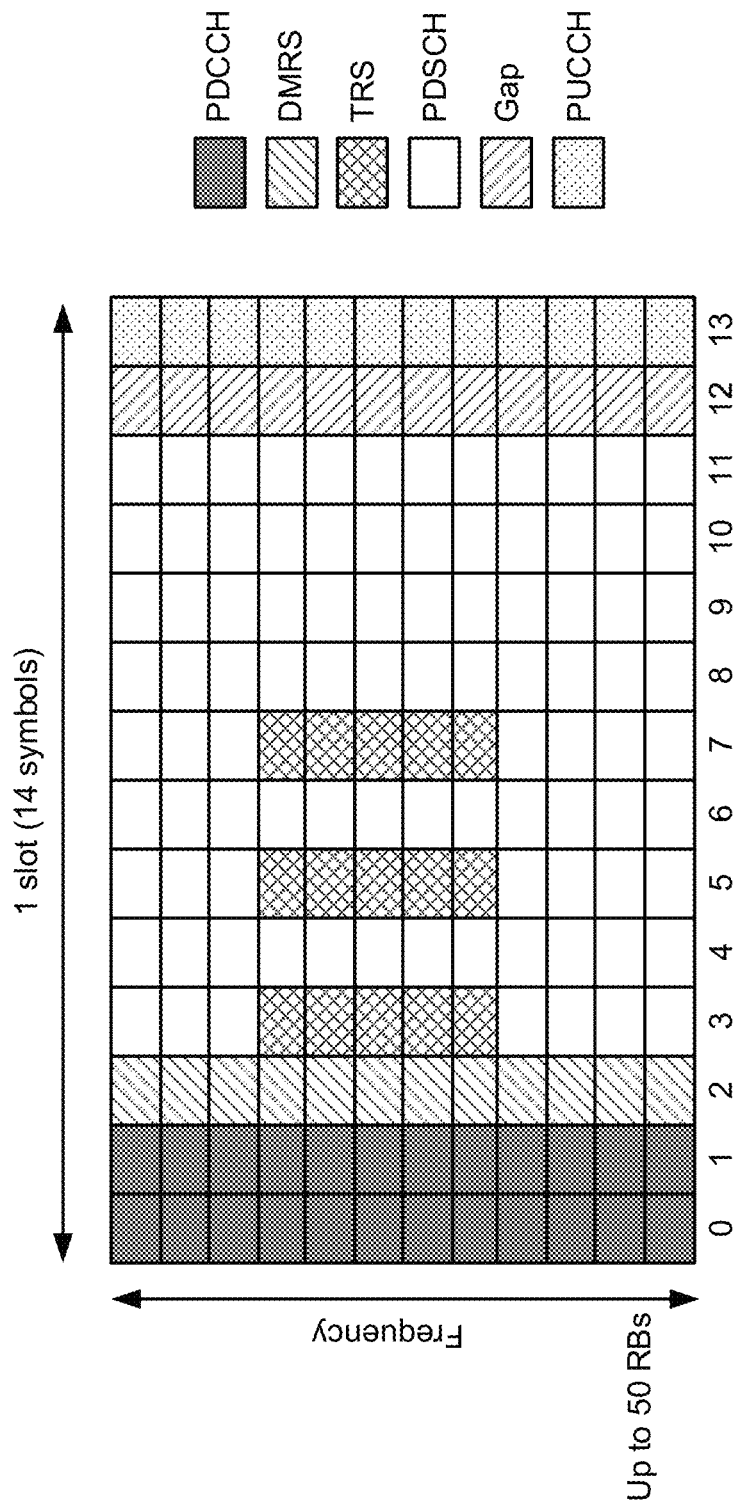
Figure 5F:
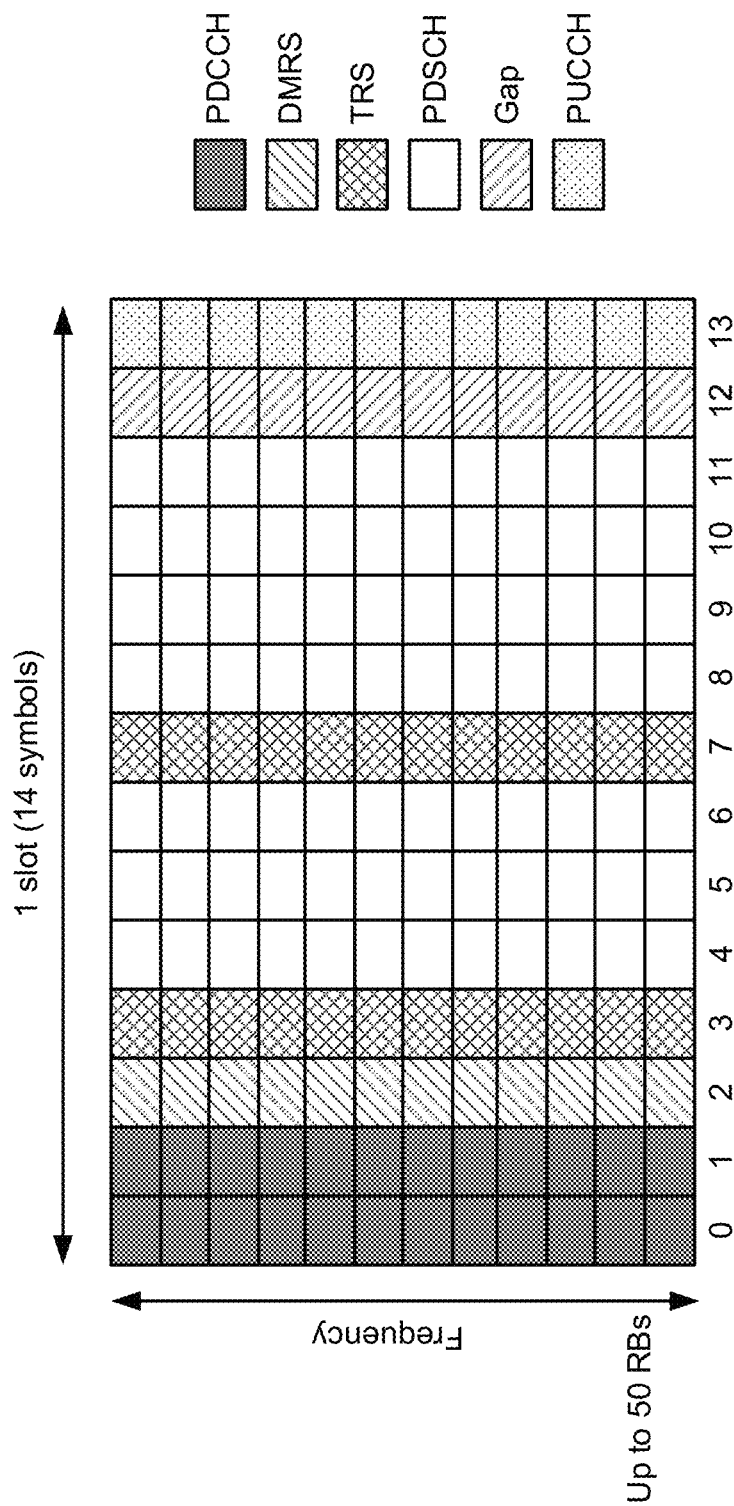

In general, the TRS frequency density and number of occupied tones may decrease as time density increases across the multiple TRS patterns. As a particular example, the first TRS pattern may have a TRS symbol spacing of two symbols and the bandwidth of the TRS symbols may be 25 RBs. An example of such a TRS pattern is illustrated in FIG. 5E. Continuing with this example, the second TRS pattern may have a TRS symbol spacing of four symbols and the bandwidth of the TRS symbols may be 50 RBs. An example of such a TRS pattern is illustrated in FIG. 5F. As another particular example, the first TRS pattern may have a TRS symbol spacing of two symbols and the TRS may be allocated in every other tone. Continuing with this example, the second TRS pattern may have a TRS symbol spacing of four symbols and the TRS may be allocated in every tone.

Figure 6:
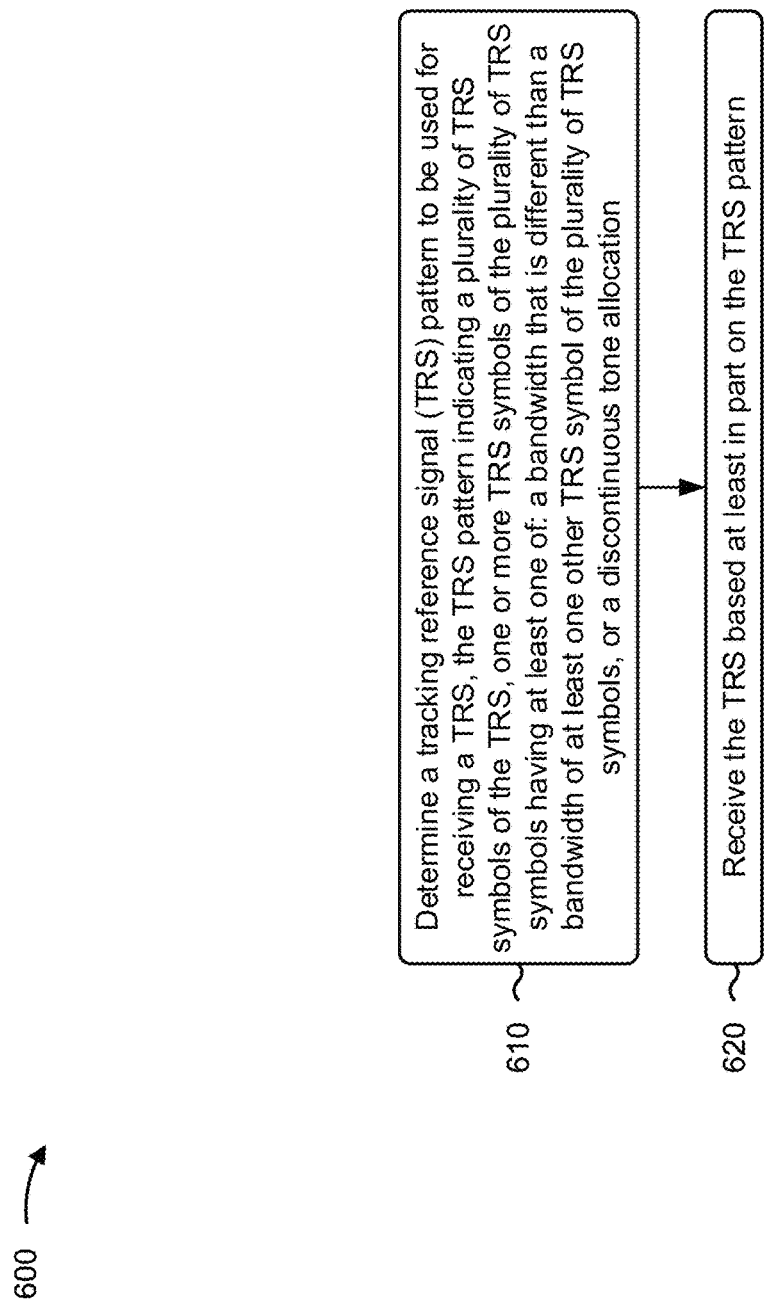
FIG. 6 is a flowchart illustrating an example process, performed by a UE, associated with a low-overhead TRS for frequency tracking, in accordance with the present disclosure.

FIG. 6 is a flowchart illustrating an example process 600 performed, for example, by a UE in accordance with the present disclosure. In the example process 600, a UE (for example, UE 120) performs operations relating to a low-overhead TRS for frequency tracking, as described herein. As shown in FIG. 6, in some aspects, process 600 may include determining a TRS pattern to be used for receiving a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation (block 610). For example, the UE (for example, using receive processor 258, transmit processor 264, controller/processor 280, memory 282, or another component) may determine a TRS pattern to be used for receiving a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation, as described above.

As further shown in FIG. 6, in some aspects, process 600 may include receiving the TRS based at least in part on the TRS pattern (block 620). For example, the UE (for example, using receive processor 258, controller/processor 280, memory 282, or another component) may receive the TRS based at least in part on the TRS pattern, as described above. Process 600 may include additional aspects, such as any single aspect or any combination of aspects described below or in connection with one or more other processes described elsewhere herein.

In a first aspect, the TRS includes at least three TRS symbols.

In a second additional aspect, alone or in combination with the first aspect, the TRS pattern indicates a first TRS symbol having a first bandwidth, a second TRS symbol having a second bandwidth, and a third TRS symbol having the first bandwidth, the second bandwidth being smaller than the first bandwidth.

In a third additional aspect, alone or in combination with one or more of the first and second aspects, the first TRS symbol and the third TRS symbol are associated with time tracking, and the second TRS symbol is associated with increasing a frequency tracking range.

In a fourth additional aspect, alone or in combination with one or more of the first through third aspects, the TRS pattern indicates that the second TRS symbol is between the first TRS symbol and the third TRS symbol in a time domain.

In a fifth additional aspect, alone or in combination with one or more of the first through fourth aspects, the TRS pattern indicates that the second TRS symbol is before the first TRS symbol and the third TRS symbol in a time domain.

In a sixth additional aspect, alone or in combination with one or more of the first through fifth aspects, the TRS pattern indicates that the second TRS symbol is after the first TRS symbol and the third TRS symbol in a time domain.

In a seventh additional aspect, alone or in combination with one or more of the first through sixth aspects, the TRS pattern indicates that each TRS symbol of the plurality of TRS symbols has a discontinuous tone allocation.

In an eighth additional aspect, alone or in combination with one or more of the first through seventh aspects, a length of a TRS burst, associated with the TRS, is less than three slots.

In a ninth additional aspect, alone or in combination with one or more of the first through eighth aspects, the one or more TRS symbols include at least one non-legacy TRS symbol.

In a tenth additional aspect, alone or in combination with one or more of the first through ninth aspects, the one or more TRS symbols include a first TRS symbol and a second TRS symbol, and a tone allocation of the first TRS symbol is different than a tone allocation of the second TRS symbol.

In an eleventh additional aspect, alone or in combination with one or more of the first through tenth aspects, the tone allocation of the first TRS symbol at least partially overlaps the tone allocation of the second TRS symbol.

In a twelfth additional aspect, alone or in combination with one or more of the first through eleventh aspects, wherein the TRS pattern is one of a plurality of configured TRS patterns, the plurality of configured TRS patterns including a first TRS pattern and a second TRS pattern, a frequency density of TRS symbols or a number of TRS tones in the first TRS pattern being different than a frequency density of TRS symbols or a number of TRS tones in the second TRS pattern, a time density of the TRS symbols of the first TRS pattern being different than a time density of the TRS symbols in the second TRS pattern, and the TRS pattern being either the first TRS pattern or the second TRS pattern.

In a thirteenth additional aspect, alone or in combination with one or more of the first through twelfth aspects, process 600 further includes transmitting, to a base station, capability information indicating whether the UE is capable of receiving TRS patterns with TRS symbols having different bandwidths or TRS symbols with discontinuous tone allocations.

In a fourteenth additional aspect, alone or in combination with one or more of the first through thirteenth aspects, process 600 further includes receiving information associated with the TRS pattern from a base station, wherein determining the TRS pattern is based at least in part on receiving the information associated with the TRS pattern from the base station.

In a fifteenth additional aspect, alone or in combination with one or more of the first through fourteenth aspects, process 600 further includes requesting the TRS pattern from the base station; and receiving information associated with the TRS pattern based at least in part on requesting the TRS pattern.

In a sixteenth additional aspect, alone or in combination with one or more of the first through fifteenth aspects, process 600 further includes indicating, to the base station, a preferred TRS pattern when requesting the TRS pattern.

In a seventeenth additional aspect, alone or in combination with one or more of the first through sixteenth aspects, the TRS pattern is preconfigured according to a wireless communication standard.

In an eighteenth additional aspect, alone or in combination with one or more of the first through seventeenth aspects, the TRS pattern is one of a plurality of configured TRS patterns, and process 600 further includes receiving an indication identifying the TRS pattern as the TRS pattern to be used for receiving the TRS, and determining the TRS pattern based at least in part on the indication.

In a nineteenth additional aspect, alone or in combination with one or more of the first through eighteenth aspects, the indication is received via at least one of downlink control information or a MAC control element (MAC-CE).

In a twentieth additional aspect, alone or in combination with one or more of the first through nineteenth aspects, process 600 includes receiving a configuration associated with the plurality of configured TRS patterns from a base station.

In a twenty first additional aspect, alone or in combination with one or more of the first through twentieth aspects, the configuration is received via RRC signaling.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
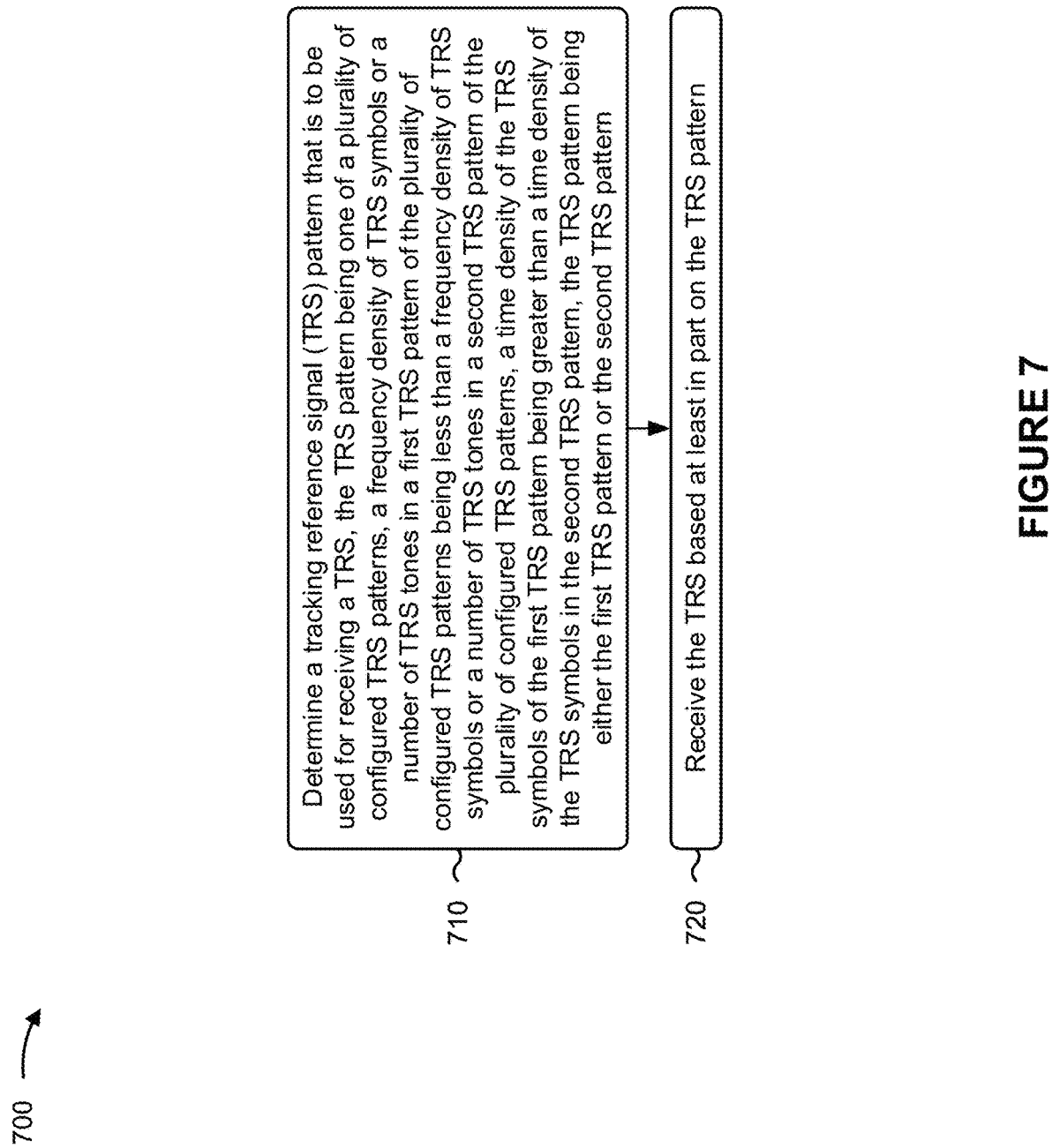
FIG. 7 is a flowchart illustrating an example process, performed by a UE, associated with a low-overhead TRS for frequency tracking, in accordance with the present disclosure.

FIG. 7 is a flowchart illustrating an example process performed, for example, by a UE in accordance with the present disclosure. Example process 700 is an example where a UE (for example, UE 120) performs operations relating to a low-overhead TRS for frequency tracking, as described herein. As shown in FIG. 7, in some aspects, process 700 may include determining a TRS pattern that is to be used for receiving a TRS, the TRS pattern being one of a plurality of configured TRS patterns, a frequency density of TRS symbols or a number of TRS tones in a first TRS pattern of the plurality of configured TRS patterns being less than a frequency density of TRS symbols or a number of TRS tones in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern (block 710). For example, the UE (for example, using receive processor 258, transmit processor 264, controller/processor 280, memory 282, or another component) may determine a TRS pattern that is to be used for receiving a TRS, the TRS pattern being one of a plurality of configured TRS patterns, a frequency density of TRS symbols or a number of TRS tones in a first TRS pattern of the plurality of configured TRS patterns being less than a frequency density of TRS symbols or a number of TRS tones in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern, as described above.

As further shown in FIG. 7, in some aspects, process 700 may include receiving the TRS based at least in part on the TRS pattern (block 720). For example, the UE (for example, using receive processor 258, controller/processor 280, memory 282, or another component) may receive the TRS based at least in part on the TRS pattern, as described above. Process 700 may include additional aspects, such as any single aspect or any combination of aspects described below or in connection with one or more other processes described elsewhere herein.

In a first aspect, the TRS includes at least three TRS symbols.

In a second additional aspect, alone or in combination with the first aspect, the TRS pattern indicates a first TRS symbol having a first bandwidth, a second TRS symbol having a second bandwidth, and a third TRS symbol having the first bandwidth, the second bandwidth being smaller than the first bandwidth.

In a third additional aspect, alone or in combination with one or more of the first and second aspects, the first TRS symbol and the third TRS symbol are associated with time tracking, and the second TRS symbol is associated with increasing a frequency tracking range.

In a fourth additional aspect, alone or in combination with one or more of the first through third aspects, the TRS pattern indicates that the second TRS symbol is between the first TRS symbol and the third TRS symbol in a time domain.

In a fifth additional aspect, alone or in combination with one or more of the first through fourth aspects, the TRS pattern indicates that the second TRS symbol is before the first TRS symbol and the third TRS symbol in a time domain.

In a sixth additional aspect, alone or in combination with one or more of the first through fifth aspects, the TRS pattern indicates that the second TRS symbol is after the first TRS symbol and the third TRS symbol in a time domain.

In a seventh additional aspect, alone or in combination with one or more of the first through sixth aspects, the TRS pattern indicates that each TRS symbol of the plurality of TRS symbols has a discontinuous tone allocation.

In an eighth additional aspect, alone or in combination with one or more of the first through seventh aspects, a length of a TRS burst, associated with the TRS, is less than three slots.

In a ninth additional aspect, alone or in combination with one or more of the first through eighth aspects, the TRS pattern include at least one non-legacy TRS symbol.

In a tenth additional aspect, alone or in combination with one or more of the first through ninth aspects, the TRS pattern includes a first TRS symbol and a second TRS symbol, a tone allocation of the first TRS symbol being different than a tone allocation of the second TRS symbol.

In an eleventh additional aspect, alone or in combination with one or more of the first through tenth aspects, the tone allocation of the first TRS symbol at least partially overlaps the tone allocation of the second TRS symbol.

In a twelfth additional aspect, alone or in combination with one or more of the first through eleventh aspects, the TRS pattern indicates a plurality of TRS symbols of the TRS, one or more TRS symbols of the plurality of TRS symbols having a bandwidth that is different than a bandwidth of at least one other TRS symbol of the plurality of TRS symbols.

In a thirteenth additional aspect, alone or in combination with one or more of the first through twelfth aspects, the TRS pattern indicates a plurality of TRS symbols of the TRS, one or more TRS symbols of the plurality of TRS symbols having a discontinuous tone allocation.

In a fourteenth additional aspect, alone or in combination with one or more of the first through thirteenth aspects, process 700 further includes transmitting, to a base station (for example, a base station 110), capability information indicating whether the UE is capable of receiving TRS patterns with TRS symbols having different bandwidths or TRS symbols with discontinuous tone allocations.

In a fifteenth additional aspect, alone or in combination with one or more of the first through fourteenth aspects, process 700 further includes receiving information associated with the TRS pattern from a base station, wherein determining the TRS pattern is based at least in part on receiving the information associated with the TRS pattern from the base station.

In a sixteenth additional aspect, alone or in combination with one or more of the first through fifteenth aspects, process 700 further includes requesting the TRS pattern from the base station; and receiving information associated with the TRS pattern based at least in part on requesting the TRS pattern.

In a seventeenth additional aspect, alone or in combination with one or more of the first through sixteenth aspects, process 700 further includes indicating, to the base station, a preferred TRS pattern when requesting the TRS pattern.

In an eighteenth additional aspect, alone or in combination with one or more of the first through seventeenth aspects, the TRS pattern is preconfigured according to a wireless communication standard.

In a nineteenth additional aspect, alone or in combination with one or more of the first through eighteenth aspects, process 700 further includes receiving an indication identifying the TRS pattern as the TRS pattern to be used for receiving the TRS; and determining the TRS pattern based at least in part on the indication.

In a twentieth additional aspect, alone or in combination with one or more of the first through nineteenth aspects, the indication is received via at least one of downlink control information or a MAC-CE.

In a twenty first additional aspect, alone or in combination with one or more of the first through twentieth aspects, process 700 includes receiving a configuration associated with the plurality of configured TRS patterns from a base station.

In a twenty second additional aspect, alone or in combination with one or more of the first through twenty first aspects, the configuration is received via RRC signaling.

Although FIG. 7 shows example blocks of process, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
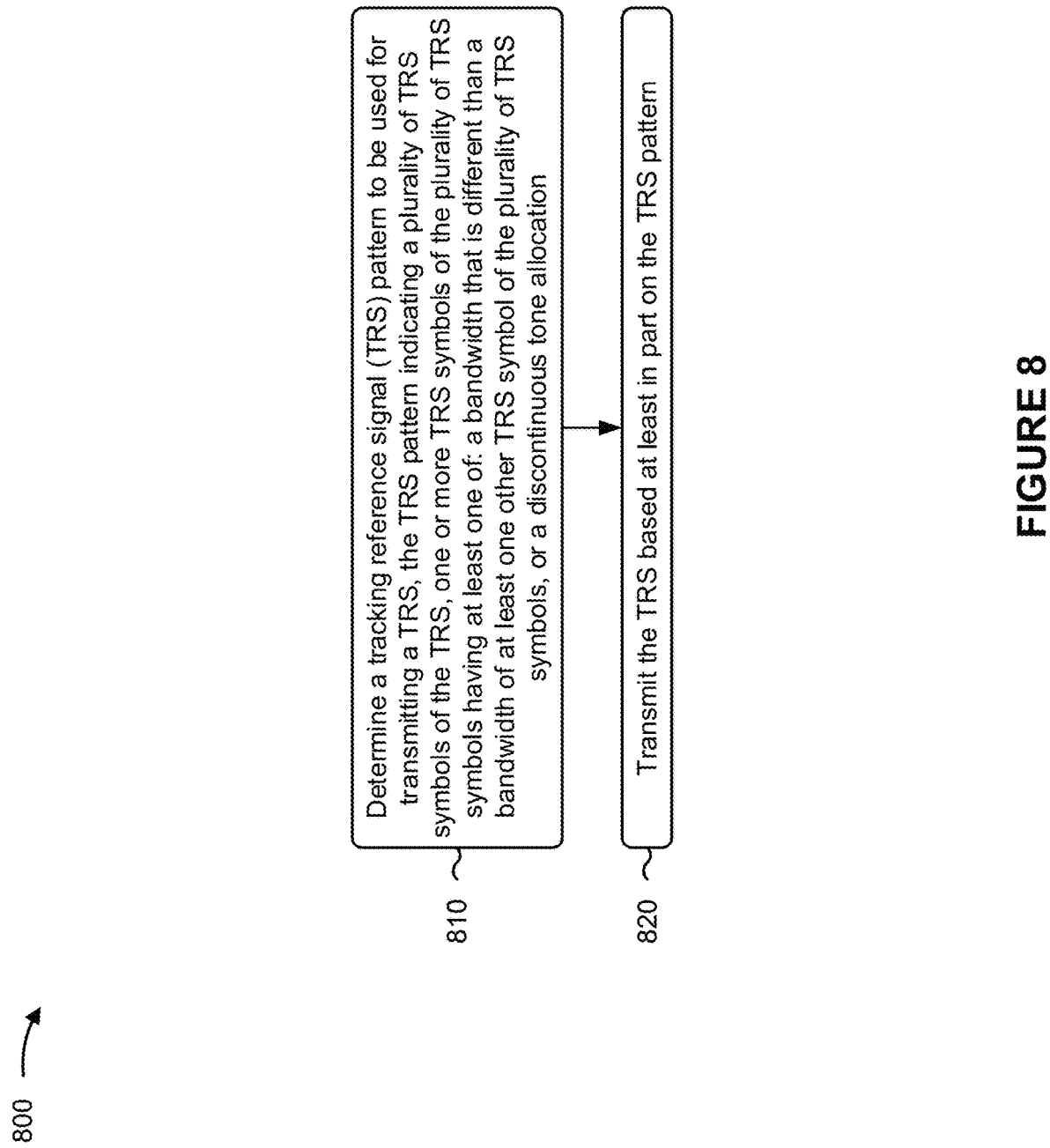
FIG. 8 is a flowchart illustrating an example process, performed by a base station, associated with a low-overhead TRS for frequency tracking, in accordance with the present disclosure.

FIG. 8 is a flowchart illustrating an example process 800 performed, for example, by a base station in accordance with the present disclosure. Example process 800 is an example where a base station (for example, base station 110) performs operations relating to a low-overhead TRS for frequency tracking, as described herein. As shown in FIG. 8, in some aspects, process 800 may include determining a TRS pattern to be used for transmitting a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation (block 810). For example, the base station (for example, using transmit processor 220, receive processor 238, controller/processor 240, memory 242, or another component) may determine a TRS pattern to be used for transmitting a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation, as described above.

As further shown in FIG. 8, in some aspects, process 800 may include transmitting the TRS based at least in part on the TRS pattern (block 820). For example, the base station (for example, using transmit processor 220, receive processor 238, controller/processor 240, memory 242, or another component) may transmit the TRS based at least in part on the TRS pattern, as described above. Process 800 may include additional aspects, such as any single aspect or any combination of aspects described below or in connection with one or more other processes described elsewhere herein.

In a first aspect, the TRS includes at least three TRS symbols.

In a second additional aspect, alone or in combination with the first aspect, the TRS pattern indicates a first TRS symbol having a first bandwidth, a second TRS symbol having a second bandwidth, and a third TRS symbol having the first bandwidth, the second bandwidth being smaller than the first bandwidth.

In a third additional aspect, alone or in combination with one or more of the first and second aspects, the first TRS symbol and the third TRS symbol are associated with time tracking, and the second TRS symbol is associated with increasing a frequency tracking range.

In a fourth additional aspect, alone or in combination with one or more of the first through third aspects, the TRS pattern indicates that the second TRS symbol is between the first TRS symbol and the third TRS symbol in a time domain.

In a fifth additional aspect, alone or in combination with one or more of the first through fourth aspects, the TRS pattern indicates that the second TRS symbol is before the first TRS symbol and the third TRS symbol in a time domain.

In a sixth additional aspect, alone or in combination with one or more of the first through fifth aspects, the TRS pattern indicates that the second TRS symbol is after the first TRS symbol and the third TRS symbol in a time domain.

In a seventh additional aspect, alone or in combination with one or more of the first through sixth aspects, the TRS pattern indicates that each TRS symbol of the plurality of TRS symbols has a discontinuous tone allocation.

In an eighth additional aspect, alone or in combination with one or more of the first through seventh aspects, a length of a TRS burst, associated with the TRS, is less than three slots.

In a ninth additional aspect, alone or in combination with one or more of the first through eighth aspects, the one or more TRS symbols include at least one non-legacy TRS symbol.

In a tenth additional aspect, alone or in combination with one or more of the first through ninth aspects, the one or more TRS symbols include a first TRS symbol and a second TRS symbol, and a tone allocation of the first TRS symbol is different than a tone allocation of the second TRS symbol.

In an eleventh additional aspect, alone or in combination with one or more of the first through tenth aspects, the tone allocation of the first TRS symbol at least partially overlaps the tone allocation of the second TRS symbol.

In a twelfth additional aspect, alone or in combination with one or more of the first through eleventh aspects, the TRS pattern is one of a plurality of configured TRS patterns, the plurality of configured TRS patterns including a first TRS pattern and a second TRS pattern, a frequency density of TRS symbols in the first TRS pattern of being different than a frequency density of TRS symbols in the second TRS pattern, a time density of the TRS symbols of the first TRS pattern being different than a time density of the TRS symbols in the second TRS pattern, and the TRS pattern being either the first TRS pattern or the second TRS pattern.

In a thirteenth additional aspect, alone or in combination with one or more of the first through twelfth aspects, process 800 further includes receiving, from a UE (for example, a UE 120), capability information indicating whether the UE is capable of receiving TRS patterns with TRS symbols having different bandwidths or TRS symbols with discontinuous tone allocations.

In a fourteenth additional aspect, alone or in combination with one or more of the first through thirteenth aspects, process 800 further includes transmitting information associated with the TRS pattern to the UE.

In a fifteenth additional aspect, alone or in combination with one or more of the first through fourteenth aspects, process 800 further includes receiving a request for the TRS pattern from the UE, wherein transmitting the information associated with the TRS pattern is based at least in part on the request.

In a sixteenth additional aspect, alone or in combination with one or more of the first through fifteenth aspects, the request from the UE indicates a preferred TRS pattern.

In a seventeenth additional aspect, alone or in combination with one or more of the first through sixteenth aspects, the TRS pattern is preconfigured according to a wireless communication standard.

In an eighteenth additional aspect, alone or in combination with one or more of the first through seventeenth aspects, the TRS pattern is one of a plurality of configured TRS patterns, and process 800 further includes transmitting an indication identifying the TRS pattern as a TRS pattern to be used by the UE for receiving the TRS.

In a nineteenth additional aspect, alone or in combination with one or more of the first through eighteenth aspects, the indication is transmitted via at least one of downlink control information or a MAC-CE.

In a twentieth additional aspect, alone or in combination with one or more of the first through nineteenth aspects, process 800 includes transmitting a configuration associated with the plurality of configured TRS patterns to the UE.

In a twenty first additional aspect, alone or in combination with one or more of the first through twentieth aspects, the configuration is transmitted via RRC signaling.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
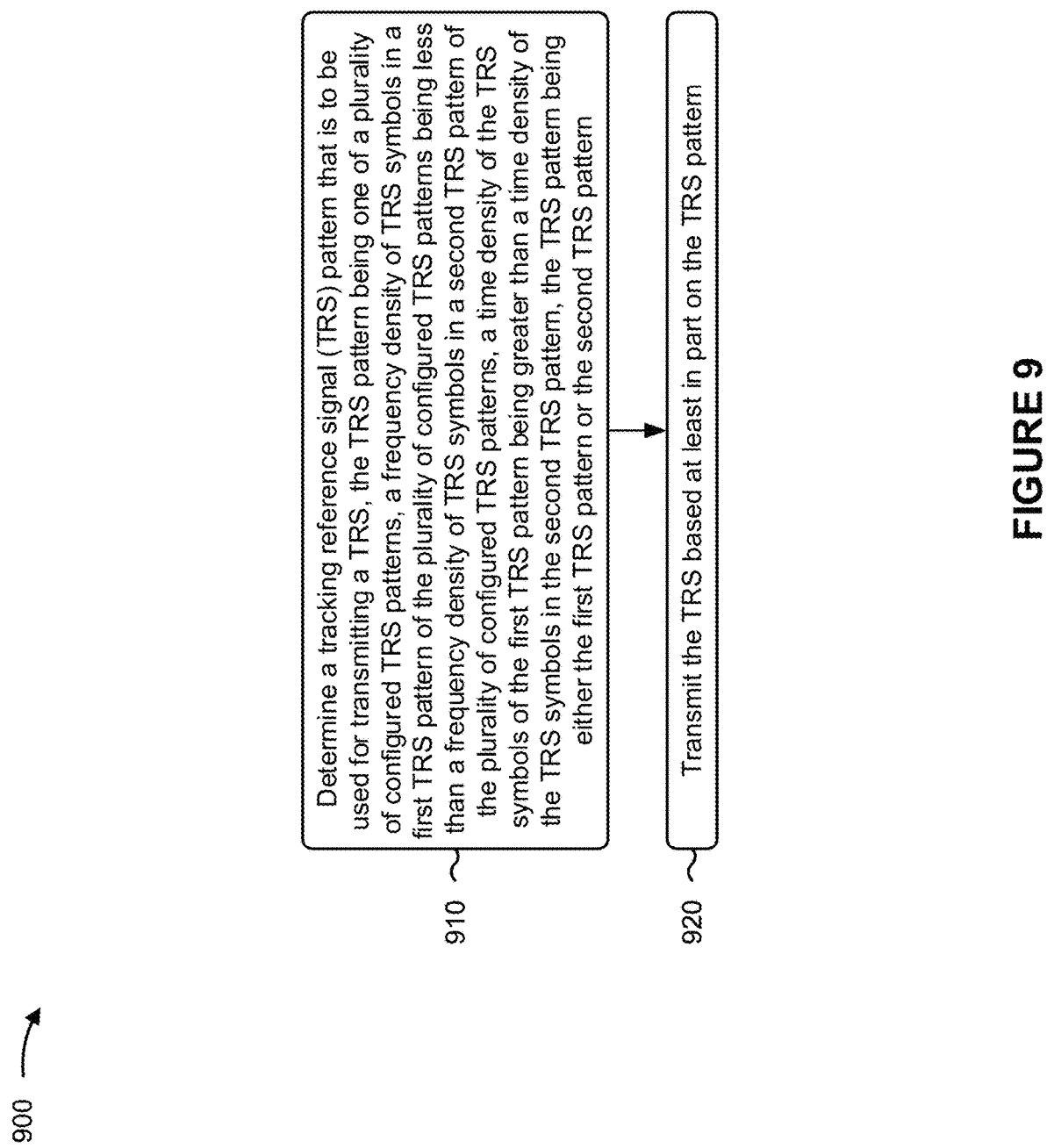
FIG. 9 is a flowchart illustrating an example process, performed by a base station, associated with a low-overhead TRS for frequency tracking, in accordance with the present disclosure.

FIG. 9 is a flowchart illustrating an example process performed, for example, by a base station in accordance with the present disclosure. Example process 900 is an example where a base station (for example, base station 110) performs operations relating to a low-overhead TRS for frequency tracking, as described herein. As shown in FIG. 9, in some aspects, process 900 may include determining a TRS pattern that is to be used for transmitting a TRS, the TRS pattern being one of a plurality of configured TRS patterns, a frequency density of TRS symbols in a first TRS pattern of the plurality of configured TRS patterns being less than a frequency density of TRS symbols in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern (block 910). For example, the base station (for example, using transmit processor 220, receive processor 238, controller/processor 240, memory 242, or another component) may determine a TRS pattern that is to be used for transmitting a TRS, the TRS pattern being one of a plurality of configured TRS patterns, a frequency density of TRS symbols in a first TRS pattern of the plurality of configured TRS patterns being less than a frequency density of TRS symbols in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern, as described above.

As further shown in FIG. 9, in some aspects, process 900 may include transmitting the TRS based at least in part on the TRS pattern (block 920). For example, the base station (for example, using transmit processor 220, controller/processor 240, memory 242, or another component) may transmit the TRS based at least in part on the TRS pattern, as described above. Process 900 may include additional aspects, such as any single aspect or any combination of aspects described below or in connection with one or more other processes described elsewhere herein.

In a first aspect, the TRS includes at least three TRS symbols.

In a second additional aspect, alone or in combination with the first aspect, the TRS pattern indicates a first TRS symbol having a first bandwidth, a second TRS symbol having a second bandwidth, and a third TRS symbol having the first bandwidth, the second bandwidth being smaller than the first bandwidth.

In a third additional aspect, alone or in combination with one or more of the first and second aspects, the first TRS symbol and the third TRS symbol are associated with time tracking, and the second TRS symbol is associated with increasing a frequency tracking range.

In a fourth additional aspect, alone or in combination with one or more of the first through third aspects, the TRS pattern indicates that the second TRS symbol is between the first TRS symbol and the third TRS symbol in a time domain.

In a fifth additional aspect, alone or in combination with one or more of the first through fourth aspects, the TRS pattern indicates that the second TRS symbol is before the first TRS symbol and the third TRS symbol in a time domain.

In a sixth additional aspect, alone or in combination with one or more of the first through fifth aspects, the TRS pattern indicates that the second TRS symbol is after the first TRS symbol and the third TRS symbol in a time domain.

In a seventh additional aspect, alone or in combination with one or more of the first through sixth aspects, the TRS pattern indicates that each TRS symbol of the plurality of TRS symbols has a discontinuous tone allocation.

In an eighth additional aspect, alone or in combination with one or more of the first through seventh aspects, a length of a TRS burst, associated with the TRS, is less than three slots.

In a ninth additional aspect, alone or in combination with one or more of the first through eighth aspects, the TRS pattern include at least one non-legacy TRS symbol.

In a tenth additional aspect, alone or in combination with one or more of the first through ninth aspects, the TRS pattern includes a first TRS symbol and a second TRS symbol, a tone allocation of the first TRS symbol being different than a tone allocation of the second TRS symbol.

In an eleventh additional aspect, alone or in combination with one or more of the first through tenth aspects, the tone allocation of the first TRS symbol at least partially overlaps the tone allocation of the second TRS symbol.

In a twelfth additional aspect, alone or in combination with one or more of the first through eleventh aspects, the TRS pattern indicates a plurality of TRS symbols of the TRS, one or more TRS symbols of the plurality of TRS symbols having a bandwidth that is different than a bandwidth of at least one other TRS symbol of the plurality of TRS symbols.

In a thirteenth additional aspect, alone or in combination with one or more of the first through twelfth aspects, the TRS pattern indicates a plurality of TRS symbols of the TRS, one or more TRS symbols of the plurality of TRS symbols having a discontinuous tone allocation.

In a fourteenth additional aspect, alone or in combination with one or more of the first through thirteenth aspects, process 900 further includes receiving, from a UE, capability information indicating whether the UE is capable of receiving TRS patterns with TRS symbols having different bandwidths or TRS symbols with discontinuous tone allocations.

In a fifteenth additional aspect, alone or in combination with one or more of the first through fourteenth aspects, process 900 further includes transmitting information associated with the TRS pattern to a UE.

In a sixteenth additional aspect, alone or in combination with one or more of the first through fifteenth aspects, process 900 further includes receiving a request for the TRS pattern from the UE, wherein transmitting the information associated with the TRS pattern is based at least in part on the request.

In a seventeenth additional aspect, alone or in combination with one or more of the first through sixteenth aspects, the request from the UE indicates a preferred TRS pattern.

In an eighteenth additional aspect, alone or in combination with one or more of the first through seventeenth aspects, the TRS pattern is preconfigured according to a wireless communication standard.

In a nineteenth additional aspect, alone or in combination with one or more of the first through eighteenth aspects, process 900 further includes transmitting an indication identifying the TRS pattern as a TRS pattern to be used by a UE for receiving the TRS.

In a twentieth additional aspect, alone or in combination with one or more of the first through nineteenth aspects, the indication is transmitted via at least one of downlink control information or a MAC-CE.

In a twenty first additional aspect, alone or in combination with one or more of the first through twentieth aspects, process 900 further includes transmitting a configuration associated with the plurality of configured TRS patterns to the UE.

In a twenty second additional aspect, alone or in combination with one or more of the first through twenty first aspects, the configuration is transmitted via radio resource control signaling.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
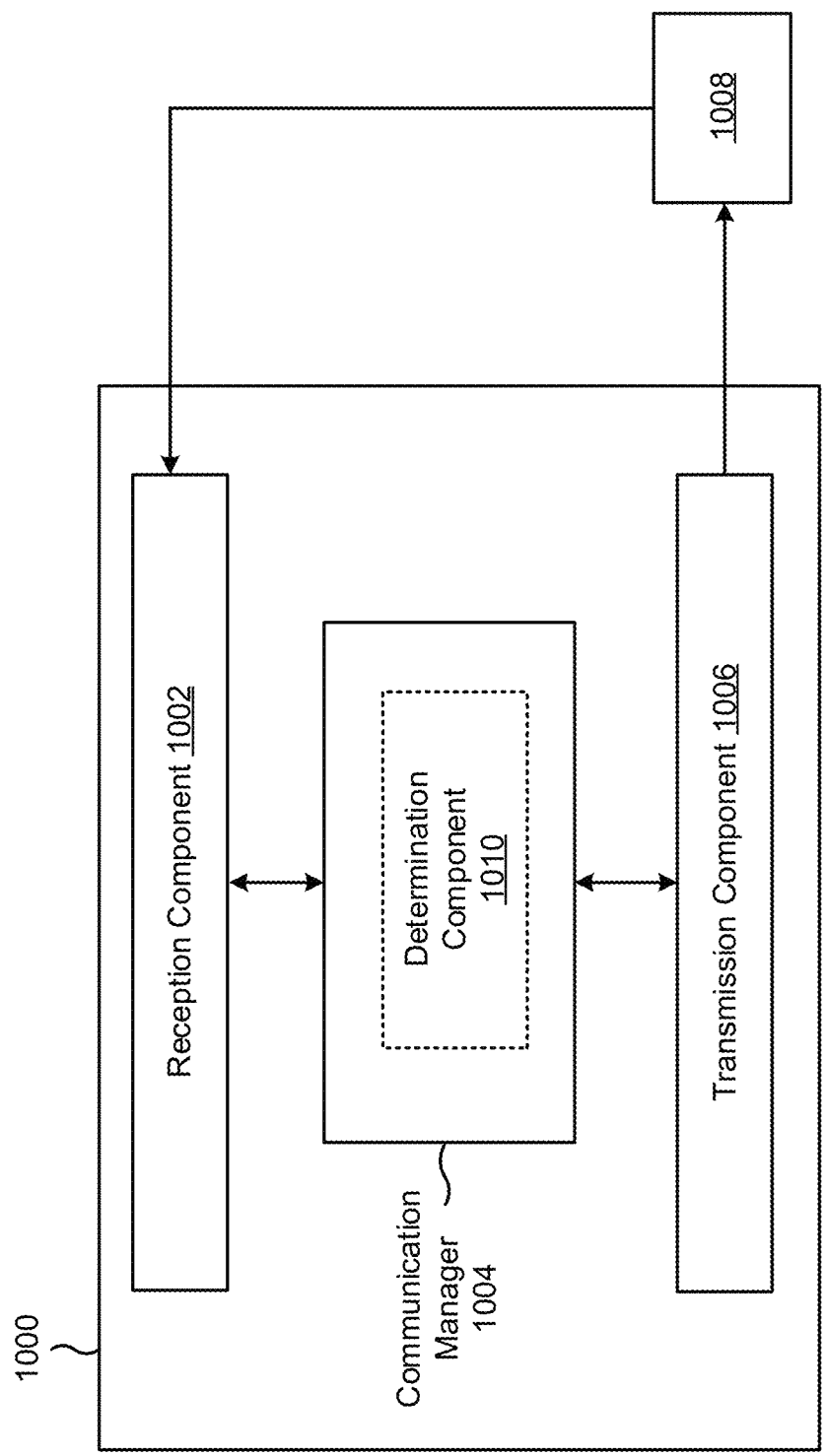
FIG. 10 is a block diagram of an example apparatus for wireless communication in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 5A-5F. Additionally or alternatively, the apparatus 1000 may be configured to perform one or more processes described herein, such as process 600 of FIG. 6, process 700 of FIG. 7, and/or one or more other processes described herein. In some aspects, the apparatus 1000 may include one or more components of the UE described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the UE described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the UE described above in connection with FIG. 2. In some aspects, the transmission component 1006 may be collocated with the reception component 1002 in a transceiver.

The communication manager 1004 may determine a TRS pattern to be used for receiving a TRS. In some aspects, the TRS pattern may indicate a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation. In some aspects, the TRS pattern may be one of a plurality of configured TRS patterns, where a frequency density of TRS symbols or a number of TRS tones in a first TRS pattern of the plurality of configured TRS patterns is less than a frequency density of TRS symbols or a number of TRS tones in a second TRS pattern of the plurality of configured TRS patterns, a time density of the TRS symbols of the first TRS pattern is greater than a time density of the TRS symbols in the second TRS pattern, and the TRS pattern is either the first TRS pattern or the second TRS pattern. The communication manager 1004 may receive or may cause the reception component 1002 to receive the TRS based at least in part on the TRS pattern. In some aspects, the communication manager 1004 may include a controller/processor, a memory, or a combination thereof, of the UE described above in connection with FIG. 2.

In some aspects, the communication manager 1004 may include a set of components, such as a TRS pattern determination component 1010. Alternatively, the set of components may be separate and distinct from the communication manager 1004. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The TRS pattern determination component 1010 may determine a TRS pattern to be used for receiving a TRS. As described above, in some aspects, the TRS pattern may indicate a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation. As described above, in some aspects, the TRS pattern may be one of a plurality of configured TRS patterns, where a frequency density of TRS symbols or a number of TRS tones in a first TRS pattern of the plurality of configured TRS patterns is less than a frequency density of TRS symbols or a number of TRS tones in a second TRS pattern of the plurality of configured TRS patterns, a time density of the TRS symbols of the first TRS pattern is greater than a time density of the TRS symbols in the second TRS pattern, and the TRS pattern is either the first TRS pattern or the second TRS pattern. The reception component 1002 may receive the TRS based at least in part on the TRS pattern.

In some aspects, the transmission component 1006 may transmit capability information indicating whether the apparatus 1000 is capable of receiving TRS patterns with TRS symbols having different bandwidths or TRS symbols with discontinuous tone allocations.

In some aspects, the reception component 1002 may receive information associated with the TRS pattern from the apparatus 1008 and the TRS pattern determination component 1010 may determine the TRS pattern based at least in part on receiving the information associated with the TRS pattern from the apparatus 1008.

In some aspects, the TRS pattern determination component 1010 and/or the transmission component 1006 may request the TRS pattern from the apparatus 1008. In some aspects, the reception component 1002 may receive information associated with the TRS pattern based at least in part on the request.

In some aspects, the reception component 1002 may receive an indication identifying the TRS pattern as the TRS pattern to be used for receiving the TRS, and the TRS pattern determination component 1010 may determine the TRS pattern based at least in part on the indication.

In some aspects, the reception component 1002 may receive a configuration associated with the plurality of configured TRS patterns from the apparatus 1008.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
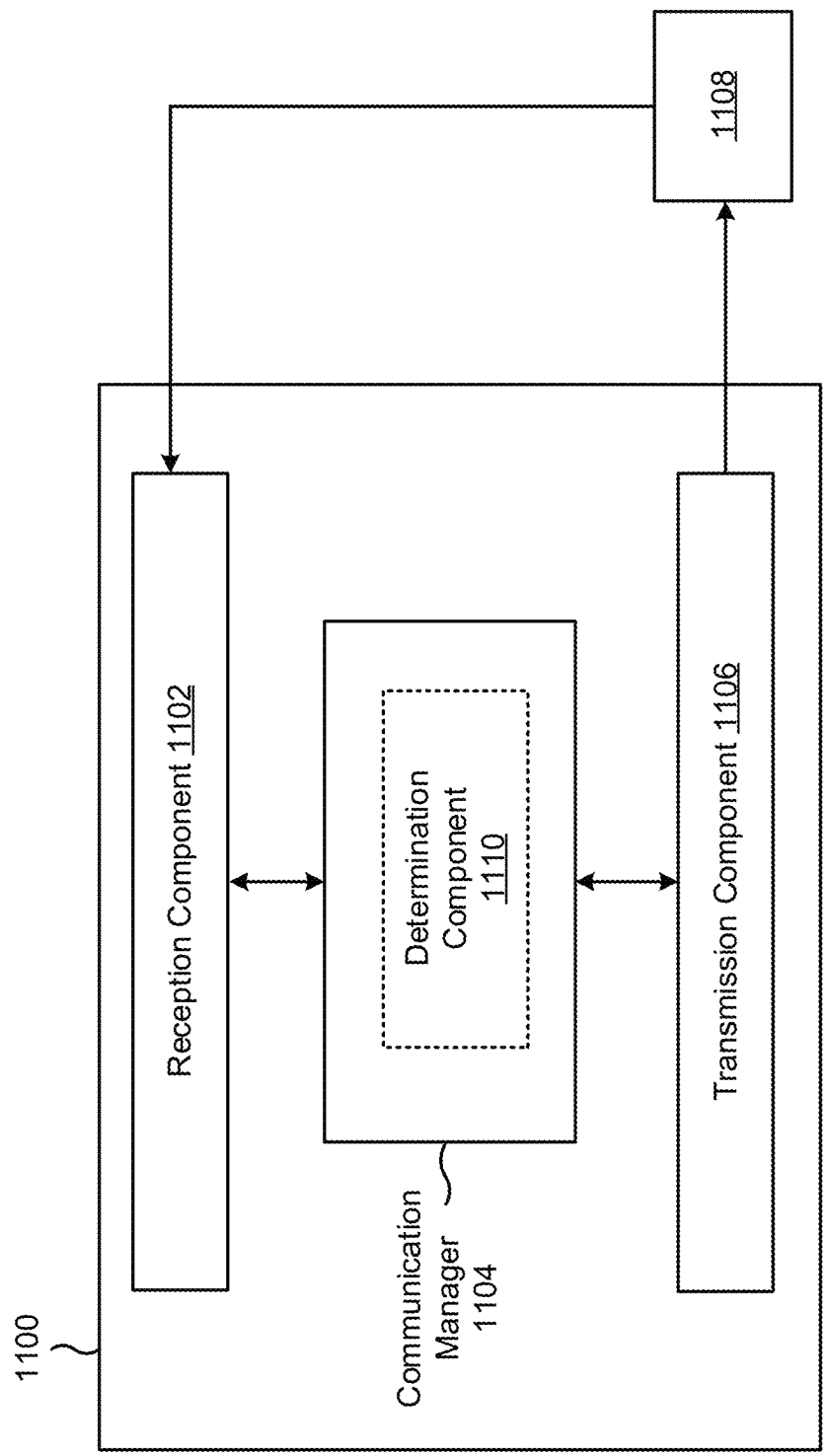
FIG. 11 is a block diagram of an example apparatus for wireless communication in accordance with the present disclosure.

FIG. 11 is a block diagram of an example apparatus 1100 for wireless communication. The apparatus 1100 may be a base station, or a base station may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE, a base station, or another wireless communication device) using the reception component 1102 and the transmission component 1106.

In some aspects, the apparatus 1100 may be configured to perform one or more operations described herein in connection with FIGS. 5A-5F. Additionally or alternatively, the apparatus 1100 may be configured to perform one or more processes described herein, such as process 800 of FIG. 8, process 900 of FIG. 9, and/or one or more other processes described herein. In some aspects, the apparatus 1100 may include one or more components of the base station described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the base station described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the base station described above in connection with FIG. 2. In some aspects, the transmission component 1106 may be collocated with the reception component 1102 in a transceiver.

The communication manager 1104 may determine a TRS pattern to be used for transmitting a TRS. In some aspects, the TRS pattern may indicate a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation. In some aspects, the TRS pattern may be one of a plurality of configured TRS patterns, where a frequency density of TRS symbols in a first TRS pattern of the plurality of configured TRS patterns is less than a frequency density of TRS symbols in a second TRS pattern of the plurality of configured TRS patterns, a time density of the TRS symbols of the first TRS pattern is greater than a time density of the TRS symbols in the second TRS pattern, and the TRS pattern is either the first TRS pattern or the second TRS pattern. The communication manager may transmit or may cause the transmission component 1106 to transmit the TRS based at least in part on the TRS pattern. In some aspects, the communication manager 1104 may include a controller/processor, a memory, a scheduler, a communication unit, or a combination thereof, of the base station described above in connection with FIG. 2.

In some aspects, the communication manager 1104 may include a set of components, such as a TRS pattern determination component 1110. Alternatively, the set of components may be separate and distinct from the communication manager 1104. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The TRS pattern determination component 1110 may determine a TRS pattern to be used for receiving a TRS. As described above, in some aspects, the TRS pattern may indicate a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation. As described above, in some aspects, the TRS pattern may be one of a plurality of configured TRS patterns, where a frequency density of TRS symbols or a number of TRS tones in a first TRS pattern of the plurality of configured TRS patterns is less than a frequency density of TRS symbols or a number of TRS tones in a second TRS pattern of the plurality of configured TRS patterns, a time density of the TRS symbols of the first TRS pattern is greater than a time density of the TRS symbols in the second TRS pattern, and the TRS pattern is either the first TRS pattern or the second TRS pattern. The transmission component 1106 may transmit the TRS based at least in part on the TRS pattern.

In some aspects, the reception component 1102 may receive, from the apparatus 1108, capability information indicating whether the UE is capable of receiving TRS patterns with TRS symbols having different bandwidths or TRS symbols with discontinuous tone allocations.

In some aspects, the transmission component 1106 may transmit information associated with the TRS pattern to the apparatus 1108.

In some aspects, the reception component 1102 may receive a request for the TRS pattern from the apparatus 1108, and the transmission component 1106 may transmit the information associated with the TRS pattern based at least in part on the request.

In some aspects, the transmission component 1106 may transmit an indication identifying the TRS pattern as a TRS pattern to be used by the apparatus 1108 for receiving the TRS.

In some aspects, the transmission component 1106 may transmit a configuration associated with a plurality of configured TRS patterns to the apparatus 1108.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: determining a tracking reference signal (TRS) pattern to be used for receiving a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation; and receiving the TRS based at least in part on the TRS pattern.

Aspect 2: The method of Aspect 1, wherein the TRS includes at least three TRS symbols.

Aspect 3: The method of any of Aspects 1-2, wherein the TRS pattern indicates a first TRS symbol having a first bandwidth, a second TRS symbol having a second bandwidth, and a third TRS symbol having the first bandwidth, the second bandwidth being smaller than the first bandwidth.

Aspect 4: The method of Aspect 3, wherein the first TRS symbol and the third TRS symbol are associated with time tracking, and the second TRS symbol is associated with increasing a frequency tracking range.

Aspect 5: The method of any of Aspects 3-4, wherein the TRS pattern indicates that the second TRS symbol is between the first TRS symbol and the third TRS symbol in a time domain.

Aspect 6: The method of any of Aspects 3-4, wherein the TRS pattern indicates that the second TRS symbol is before the first TRS symbol and the third TRS symbol in a time domain.

Aspect 7: The method of any of Aspects 3-4, wherein the TRS pattern indicates that the second TRS symbol is after the first TRS symbol and the third TRS symbol in a time domain.

Aspect 8: The method of any of Aspects 1-7, wherein the TRS pattern indicates that each TRS symbol of the plurality of TRS symbols has a discontinuous tone allocation.

Aspect 9: The method of any of Aspects 1-8, wherein a length of a TRS burst, associated with the TRS, is less than three slots.

Aspect 10: The method of any of Aspects 1-9, wherein the one or more TRS symbols include at least one non-legacy TRS symbol.

Aspect 11: The method of any of Aspects 1-10, wherein the one or more TRS symbols include a first TRS symbol and a second TRS symbol, and wherein a tone allocation of the first TRS symbol is different than a tone allocation of the second TRS symbol.

Aspect 12: The method of Aspect 11, wherein the tone allocation of the first TRS symbol at least partially overlaps the tone allocation of the second TRS symbol.

Aspect 13: The method of any of Aspects 1-12, wherein the TRS pattern is one of a plurality of configured TRS patterns, the plurality of configured TRS patterns including a first TRS pattern and a second TRS pattern, a frequency density of TRS symbols or a number of TRS tones in the first TRS pattern being different than a frequency density of TRS symbols or a number of TRS tones in the second TRS pattern, a time density of the TRS symbols of the first TRS pattern being different than a time density of the TRS symbols in the second TRS pattern, and the TRS pattern being either the first TRS pattern or the second TRS pattern.

Aspect 14: The method of any of Aspects 1-13, further comprising transmitting, to a base station, capability information indicating whether the UE is capable of receiving TRS patterns with TRS symbols having different bandwidths or TRS symbols with discontinuous tone allocations.

Aspect 15: The method of any of Aspects 1-14, further comprising receiving information associated with the TRS pattern from a base station, wherein determining the TRS pattern is based at least in part on receiving the information associated with the TRS pattern from the base station.

Aspect 16: The method of Aspect 15, further comprising: requesting the TRS pattern from the base station; and receiving information associated with the TRS pattern based at least in part on requesting the TRS pattern.

Aspect 17: The method of Aspect 16, further comprising indicating, to the base station, a preferred TRS pattern when requesting the TRS pattern.

Aspect 18: The method of any of Aspects 1-17, wherein the TRS pattern is preconfigured according to a wireless communication standard.

Aspect 19: The method of any of Aspects 1-18, wherein the TRS pattern is one of a plurality of configured TRS patterns, and wherein the method further comprises: receiving an indication identifying the TRS pattern as the TRS pattern to be used for receiving the TRS; and determining the TRS pattern based at least in part on the indication.

Aspect 20: The method of Aspect 19, wherein the indication is received via at least one of downlink control information or a medium access control element.

Aspect 21: The method of any of Aspects 19-20, further comprising receiving a configuration associated with the plurality of configured TRS patterns from a base station.

Aspect 22: The method of Aspect 21, wherein the configuration is received via radio resource control signaling.

Aspect 23: A method of wireless communication performed by a user equipment (UE), comprising: determining a tracking reference signal (TRS) pattern that is to be used for receiving a TRS, the TRS pattern being one of a plurality of configured TRS patterns, a frequency density of TRS symbols or a number of TRS tones in a first TRS pattern of the plurality of configured TRS patterns being less than a frequency density of TRS symbols or a number of TRS tones in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern; and receiving the TRS based at least in part on the TRS pattern.

Aspect 24: The method of Aspect 23, wherein the TRS includes at least three TRS symbols.

Aspect 25: The method of any of Aspects 23-24, wherein the TRS pattern indicates a first TRS symbol having a first bandwidth, a second TRS symbol having a second bandwidth, and a third TRS symbol having the first bandwidth, the second bandwidth being smaller than the first bandwidth.

Aspect 26: The method of any of Aspects 23-25, wherein the first TRS symbol and the third TRS symbol are associated with time tracking, and the second TRS symbol is associated with increasing a frequency tracking range.

Aspect 27: The method of any of Aspects 25-26, wherein the TRS pattern indicates that the second TRS symbol is between the first TRS symbol and the third TRS symbol in a time domain.

Aspect 28: The method of any of Aspects 25-26, wherein the TRS pattern indicates that the second TRS symbol is before the first TRS symbol and the third TRS symbol in a time domain.

Aspect 29: The method of any of Aspects 25-26, wherein the TRS pattern indicates that the second TRS symbol is after the first TRS symbol and the third TRS symbol in a time domain.

Aspect 30: The method of any of Aspects 23-29, wherein the TRS pattern indicates that each TRS symbol of a plurality of TRS symbols has a discontinuous tone allocation.

Aspect 31: The method of any of Aspects 23-30, wherein a length of a TRS burst, associated with the TRS, is less than three slots.

Aspect 32: The method of any of Aspects 23-31, wherein the TRS pattern include at least one non-legacy TRS symbol.

Aspect 33: The method of any of Aspects 23-32, wherein the TRS pattern includes a first TRS symbol and a second TRS symbol, a tone allocation of the first TRS symbol being different than a tone allocation of the second TRS symbol.

Aspect 34: The method of Aspect 33, wherein the tone allocation of the first TRS symbol at least partially overlaps the tone allocation of the second TRS symbol.

Aspect 35: The method of any of Aspects 23-34, wherein the TRS pattern indicates a plurality of TRS symbols of the TRS, one or more TRS symbols of the plurality of TRS symbols having a bandwidth that is different than a bandwidth of at least one other TRS symbol of the plurality of TRS symbols.

Aspect 36: The method of any of Aspects 23-35, wherein the TRS pattern indicates a plurality of TRS symbols of the TRS, one or more TRS symbols of the plurality of TRS symbols having a discontinuous tone allocation.

Aspect 37: The method of any of Aspects 23-36, further comprising transmitting, to a base station, capability information indicating whether the UE is capable of receiving TRS patterns with TRS symbols having different bandwidths or TRS symbols with discontinuous tone allocations.

Aspect 38: The method of any of Aspects 23-37, further comprising: receiving information associated with the TRS pattern from a base station, wherein determining the TRS pattern is based at least in part on receiving the information associated with the TRS pattern from the base station.

Aspect 39: The method of Aspect 38, further comprising: requesting the TRS pattern from the base station; and receiving information associated with the TRS pattern based at least in part on requesting the TRS pattern.

Aspect 40: The method of Aspect 39, further comprising indicating, to the base station, a preferred TRS pattern when requesting the TRS pattern.

Aspect 41: The method of any of Aspects 23-40, wherein the TRS pattern is preconfigured according to a wireless communication standard.

Aspect 42: The method of any of Aspects 23-41, further comprising: receiving an indication identifying the TRS pattern as the TRS pattern to be used for receiving the TRS; and determining the TRS pattern based at least in part on the indication.

Aspect 43: The method of Aspect 42, wherein the indication is received via at least one of downlink control information or a medium access control element.

Aspect 44: The method of any of Aspects 42-43, further comprising receiving a configuration associated with the plurality of configured TRS patterns from a base station.

Aspect 45: The method of Aspect 44, wherein the configuration is received via radio resource control signaling.

Aspect 46: A method of wireless communication performed by a base station, comprising: determining a tracking reference signal (TRS) pattern to be used for transmitting a TRS, the TRS pattern indicating a plurality of TRS symbols of the TRS, one or more TRS symbols of the plurality of TRS symbols having at least one of: a bandwidth that is different than a bandwidth of at least one other TRS symbol of the plurality of TRS symbols, or a discontinuous tone allocation; and transmitting the TRS based at least in part on the TRS pattern.

Aspect 47: The method of Aspect 46, wherein the TRS includes at least three TRS symbols.

Aspect 48: The method of any of Aspects 46-47, wherein the TRS pattern indicates a first TRS symbol having a first bandwidth, a second TRS symbol having a second bandwidth, and a third TRS symbol having the first bandwidth, the second bandwidth being smaller than the first bandwidth.

Aspect 49: The method of Aspect 48, wherein the first TRS symbol and the third TRS symbol are associated with time tracking, and the second TRS symbol is associated with increasing a frequency tracking range.

Aspect 50: The method of any of Aspects 48-49, wherein the TRS pattern indicates that the second TRS symbol is between the first TRS symbol and the third TRS symbol in a time domain.

Aspect 51: The method of any of Aspects 48-49, wherein the TRS pattern indicates that the second TRS symbol is before the first TRS symbol and the third TRS symbol in a time domain.

Aspect 52: The method of any of Aspects 48-49, wherein the TRS pattern indicates that the second TRS symbol is after the first TRS symbol and the third TRS symbol in a time domain.

Aspect 53: The method of any of Aspects 46-52, wherein the TRS pattern indicates that each TRS symbol of the plurality of TRS symbols has a discontinuous tone allocation.

Aspect 54: The method of any of Aspects 46-53, wherein a length of a TRS burst, associated with the TRS, is less than three slots.

Aspect 55: The method of any of Aspects 46-54, wherein the one or more TRS symbols include at least one non-legacy TRS symbol.

Aspect 56: The method of any of Aspects 46-55, wherein the one or more TRS symbols include a first TRS symbol and a second TRS symbol, and wherein a tone allocation of the first TRS symbol is different than a tone allocation of the second TRS symbol.

Aspect 57: The method of Aspect 56, wherein the tone allocation of the first TRS symbol at least partially overlaps the tone allocation of the second TRS symbol.

Aspect 58: The method of any of Aspects 46-57, wherein the TRS pattern is one of a plurality of configured TRS patterns, the plurality of configured TRS patterns including a first TRS pattern and a second TRS pattern, a frequency density of TRS symbols in the first TRS pattern of being different than a frequency density of TRS symbols in the second TRS pattern, a time density of the TRS symbols of the first TRS pattern being different than a time density of the TRS symbols in the second TRS pattern, and the TRS pattern being either the first TRS pattern or the second TRS pattern.

Aspect 59: The method of any of Aspects 46-58, further comprising receiving, from a user equipment (UE) capability information indicating whether the UE is capable of receiving TRS patterns with TRS symbols having different bandwidths or TRS symbols with discontinuous tone allocations.

Aspect 60: The method of any of Aspects 46-59, further comprising transmitting information associated with the TRS pattern to a user equipment (UE).

Aspect 61: The method of Aspect 60, further comprising: receiving a request for the TRS pattern from the UE, wherein transmitting the information associated with the TRS pattern is based at least in part on the request.

Aspect 62: The method of Aspect 61, wherein the request from the UE indicates a preferred TRS pattern.

Aspect 63: The method of any of Aspects 46-62, wherein the TRS pattern is preconfigured according to a wireless communication standard.

Aspect 64: The method of any of Aspects 46-63, wherein the TRS pattern is one of a plurality of configured TRS patterns, and wherein the method further comprises transmitting an indication identifying the TRS pattern as a TRS pattern to be used by a user equipment (UE) for receiving the TRS.

Aspect 65: The method of Aspect 64, wherein the indication is transmitted via at least one of downlink control information or a medium access control element.

Aspect 66: The method of any of Aspects 64-65, further comprising transmitting a configuration associated with the plurality of configured TRS patterns to the UE.

Aspect 67: The method of Aspect 66, wherein the configuration is transmitted via radio resource control signaling.

Aspect 68: A method of wireless communication performed by a base station, comprising: determining a tracking reference signal (TRS) pattern that is to be used for transmitting a TRS, the TRS pattern being one of a plurality of configured TRS patterns, a frequency density of TRS symbols in a first TRS pattern of the plurality of configured TRS patterns being less than a frequency density of TRS symbols in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern; and transmitting the TRS based at least in part on the TRS pattern.

Aspect 69: The method of Aspect 68, wherein the TRS includes at least three TRS symbols.

Aspect 70: The method of any of Aspects 68-69, wherein the TRS pattern indicates a first TRS symbol having a first bandwidth, a second TRS symbol having a second bandwidth, and a third TRS symbol having the first bandwidth, the second bandwidth being smaller than the first bandwidth.

Aspect 71: The method of Aspect 70, wherein the first TRS symbol and the third TRS symbol are associated with time tracking, and the second TRS symbol is associated with increasing a frequency tracking range.

Aspect 72: The method of any of Aspects 70-71, wherein the TRS pattern indicates that the second TRS symbol is between the first TRS symbol and the third TRS symbol in a time domain.

Aspect 73: The method of any of Aspects 70-71, wherein the TRS pattern indicates that the second TRS symbol is before the first TRS symbol and the third TRS symbol in a time domain.

Aspect 74: The method of any of Aspects 70-71, wherein the TRS pattern indicates that the second TRS symbol is after the first TRS symbol and the third TRS symbol in a time domain.

Aspect 75: The method of any of Aspects 68-74, wherein the TRS pattern indicates that each TRS symbol of a plurality of TRS symbols has a discontinuous tone allocation.

Aspect 76: The method of any of Aspects 68-75, wherein a length of a TRS burst, associated with the TRS, is less than three slots.

Aspect 77: The method of any of Aspects 68-76, wherein the TRS pattern include at least one non-legacy TRS symbol.

Aspect 78: The method of any of Aspects 68-77, wherein the TRS pattern includes a first TRS symbol and a second TRS symbol, a tone allocation of the first TRS symbol being different than a tone allocation of the second TRS symbol.

Aspect 79: The method of Aspect 78, wherein the tone allocation of the first TRS symbol at least partially overlaps the tone allocation of the second TRS symbol.

Aspect 80: The method of any of Aspects 68-79, wherein the TRS pattern indicates a plurality of TRS symbols of the TRS, one or more TRS symbols of the plurality of TRS symbols having a bandwidth that is different than a bandwidth of at least one other TRS symbol of the plurality of TRS symbols.

Aspect 81: The method of any of Aspects 68-80, wherein the TRS pattern indicates a plurality of TRS symbols of the TRS, one or more TRS symbols of the plurality of TRS symbols having a discontinuous tone allocation.

Aspect 82: The method of any of Aspects 68-81, further comprising receiving, from a user equipment (UE), capability information indicating whether the UE is capable of receiving TRS patterns with TRS symbols having different bandwidths or TRS symbols with discontinuous tone allocations.

Aspect 83: The method of any of Aspects 68-82, further comprising transmitting information associated with the TRS pattern to a user equipment (UE).

Aspect 84: The method of Aspect 83, further comprising: receiving a request for the TRS pattern from the UE, wherein transmitting the information associated with the TRS pattern is based at least in part on the request.

Aspect 85: The method of Aspect 84, wherein the request from the UE indicates a preferred TRS pattern.

Aspect 86: The method of any of Aspects 68-85, wherein the TRS pattern is preconfigured according to a wireless communication standard.

Aspect 87: The method of any of Aspects 68-86, further comprising transmitting an indication identifying the TRS pattern as a TRS pattern to be used by a user equipment (UE) for receiving the TRS.

Aspect 88: The method of Aspect 87, wherein the indication is transmitted via at least one of downlink control information or a medium access control element.

Aspect 89: The method of any of Aspects 87-88, further comprising transmitting a configuration associated with the plurality of configured TRS patterns to the UE.

Aspect 90: The method of Aspect 89, wherein the configuration is transmitted via radio resource control signaling.

Aspect 91: An apparatus for wireless communication at a device, comprising a processor; memory coupled with the processor; and instructions stored in the memory and executable by the processor to cause the apparatus to perform the method of one or more of Aspects 1-22.

Aspect 92: A device for wireless communication, comprising a memory and one or more processors coupled to the memory, the one or more processors configured to perform the method of one or more of Aspects 1-22.

Aspect 93: An apparatus for wireless communication, comprising at least one means for performing the method of one or more of Aspects 1-22.

Aspect 94: A non-transitory computer-readable medium storing code for wireless communication, the code comprising instructions executable by a processor to perform the method of one or more of Aspects 1-22.

Aspect 95: A non-transitory computer-readable medium storing a set of instructions for wireless communication, the set of instructions comprising one or more instructions that, when executed by one or more processors of a device, cause the device to perform the method of one or more of Aspects 1-22.

Aspect 96: An apparatus for wireless communication at a device, comprising a processor; memory coupled with the processor; and instructions stored in the memory and executable by the processor to cause the apparatus to perform the method of one or more of Aspects 23-45.

Aspect 97: A device for wireless communication, comprising a memory and one or more processors coupled to the memory, the one or more processors configured to perform the method of one or more of Aspects 23-45.

Aspect 98: An apparatus for wireless communication, comprising at least one means for performing the method of one or more of Aspects 23-45.

Aspect 99: A non-transitory computer-readable medium storing code for wireless communication, the code comprising instructions executable by a processor to perform the method of one or more of Aspects 23-45.

Aspect 100: A non-transitory computer-readable medium storing a set of instructions for wireless communication, the set of instructions comprising one or more instructions that, when executed by one or more processors of a device, cause the device to perform the method of one or more of Aspects 23-45.

Aspect 101: An apparatus for wireless communication at a device, comprising a processor; memory coupled with the processor; and instructions stored in the memory and executable by the processor to cause the apparatus to perform the method of one or more of Aspects 46-67.

Aspect 102: A device for wireless communication, comprising a memory and one or more processors coupled to the memory, the one or more processors configured to perform the method of one or more of Aspects 46-67.

Aspect 103: An apparatus for wireless communication, comprising at least one means for performing the method of one or more of Aspects 46-67.

Aspect 104: A non-transitory computer-readable medium storing code for wireless communication, the code comprising instructions executable by a processor to perform the method of one or more of Aspects 46-67.

Aspect 105: A non-transitory computer-readable medium storing a set of instructions for wireless communication, the set of instructions comprising one or more instructions that, when executed by one or more processors of a device, cause the device to perform the method of one or more of Aspects 46-67.

Aspect 106: An apparatus for wireless communication at a device, comprising a processor; memory coupled with the processor; and instructions stored in the memory and executable by the processor to cause the apparatus to perform the method of one or more of Aspects 68-90.

Aspect 107: A device for wireless communication, comprising a memory and one or more processors coupled to the memory, the one or more processors configured to perform the method of one or more of Aspects 68-90.

Aspect 108: An apparatus for wireless communication, comprising at least one means for performing the method of one or more of Aspects 68-90.

Aspect 109: A non-transitory computer-readable medium storing code for wireless communication, the code comprising instructions executable by a processor to perform the method of one or more of Aspects 68-90.

Aspect 110: A non-transitory computer-readable medium storing a set of instructions for wireless communication, the set of instructions comprising one or more instructions that, when executed by one or more processors of a device, cause the device to perform the method of one or more of Aspects 68-90.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise.

What is claimed is:

1. A user equipment (UE) for wireless communication, comprising:
    one processor one or more memories storing processor-executable code; and
    one or more processors coupled with the one or more memories and individually or collectively configured to, when executing the code, cause the UE to:
    determine a tracking reference signal (TRS) pattern to be used for receiving a TRS, the TRS pattern indicating:
        a plurality of TRS symbols of the TRS within a slot,
        a first quantity of resource blocks allocated in a first TRS symbol in the slot, and
        a second quantity of resource blocks allocated in a second TRS symbol in the slot, the first quantity of resource blocks being different than the second quantity of resource blocks; and
    receive the TRS in the slot based at least in part on the TRS pattern.

2. The UE of claim 1, wherein the TRS includes at least three TRS symbols.

3. The UE of claim 1, wherein the TRS pattern indicates the first TRS symbol having a first bandwidth, the second TRS symbol having a second bandwidth, and a third TRS symbol having the first bandwidth, the second bandwidth being smaller than the first bandwidth.

4. The UE of claim 3, wherein the first TRS symbol and the third TRS symbol are associated with time tracking, and the second TRS symbol is associated with increasing a frequency tracking range.

5. The UE of claim 3, wherein the TRS pattern indicates one of:
    that the second TRS symbol is between the first TRS symbol and the third TRS symbol in a time domain,
    that the second TRS symbol is before the first TRS symbol and the third TRS symbol in a time domain, or
    that the second TRS symbol is after the first TRS symbol and the third TRS symbol in a time domain.

6. The UE of claim 1, wherein the TRS pattern indicates that each TRS symbol of the plurality of TRS symbols has a discontinuous tone allocation.

7. The UE of claim 1, wherein a length of a TRS burst, associated with the TRS, is less than three slots.

8. The UE of claim 1, wherein the plurality of TRS symbols include at least one non-legacy TRS symbol.

9. The UE of claim 1, wherein a tone allocation of the first TRS symbol is different than a tone allocation of the second TRS symbol.

10. The UE of claim 9, wherein the tone allocation of the first TRS symbol at least partially overlaps the tone allocation of the second TRS symbol.

11. The UE of claim 1, wherein:
    the TRS pattern is one of a plurality of configured TRS patterns, the plurality of configured TRS patterns including a first TRS pattern and a second TRS pattern,
    a frequency density of TRS symbols or a number of TRS tones in the first TRS pattern being different than a frequency density of TRS symbols or a number of TRS tones in the second TRS pattern,
    a time density of the TRS symbols of the first TRS pattern being different than a time density of the TRS symbols in the second TRS pattern, and
    the TRS pattern being either the first TRS pattern or the second TRS pattern.

12. The UE of claim 1, wherein the one or more processors, individually or collectively, are further configured to cause the UE to transmit, to a base station, capability information indicating whether the UE is capable of receiving TRS patterns with TRS symbols having different bandwidths or TRS symbols with discontinuous tone allocations.

13. The UE of claim 1, wherein the one or more processors, individually or collectively, are further configured to cause the UE to:
receive information associated with the TRS pattern from a base station, wherein determining the TRS pattern is based at least in part on receiving the information associated with the TRS pattern from the base station.

14. The UE of claim 13, wherein the one or more processors, individually or collectively, are further configured to cause the UE to:
request the TRS pattern from the base station; and
receive information associated with the TRS pattern based at least in part on requesting the TRS pattern.

15. The UE of claim 14, wherein the one or more processors, individually or collectively, are further configured to cause the UE to indicate, to the base station, a preferred TRS pattern when requesting the TRS pattern.

16. The UE of claim 1, wherein the TRS pattern is preconfigured according to a wireless communication standard.

17. The UE of claim 1, wherein the TRS pattern is one of a plurality of configured TRS patterns, and wherein the one or more processors, individually or collectively, are further configured to cause the UE to:
receive an indication identifying the TRS pattern as the TRS pattern to be used for receiving the TRS; and
determine the TRS pattern based at least in part on the indication.

18. The UE of claim 17, wherein the indication is received via at least one of downlink control information or a medium access control element.

19. The UE of claim 17, wherein the one or more processors, individually or collectively, are further configured to cause the UE to receive a configuration associated with the plurality of configured TRS patterns from a base station.

20. The UE of claim 19, wherein the configuration is received via radio resource control signaling.

21. A user equipment (UE) for wireless communication, comprising:
one processor one or more memories storing processor-executable code; and
one or more processors coupled with the one or more memories and individually or collectively configured to, when executing the code, cause the UE to:
determine a tracking reference signal (TRS) pattern that is to be used for receiving a TRS within a slot, the TRS pattern being one of a plurality of configured TRS patterns, a frequency density of TRS symbols or a number of TRS tones in a first TRS pattern of the plurality of configured TRS patterns being less than a frequency density of TRS symbols or a number of TRS tones in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern, the TRS pattern indicating:
a plurality of TRS symbols of the TRS within the slot,
a first quantity of resource blocks allocated in a first TRS symbol in the slot, and
a second quantity of resource blocks allocated in a second TRS symbol in the slot, the first quantity of resource blocks being different than the second quantity of resource blocks; and
receive the TRS in the slot based at least in part on the TRS pattern.

22. The UE of claim 21, wherein the TRS includes at least three TRS symbols.

23. The UE of claim 21, wherein the TRS pattern indicates one or more TRS symbols of the plurality of TRS symbols have a bandwidth that is different than a bandwidth of at least one other TRS symbol of the plurality of TRS symbols.

24. The UE of claim 21, wherein the TRS pattern indicates one or more TRS symbols of the plurality of TRS symbols have a discontinuous tone allocation.

25. A base station for wireless communication, comprising:
one or more memories storing processor-executable code; and
one or more processors coupled with the one or more memories and individually or collectively configured to, when executing the code, cause the base station to:
determine a tracking reference signal (TRS) pattern to be used for transmitting a TRS, the TRS pattern indicating:
a plurality of TRS symbols of the TRS within a slot,
a first quantity of resource blocks allocated in a first TRS symbol in the slot, and
a second quantity of resource blocks allocated in a second TRS symbol in the slot, the first quantity of resource blocks being different than the second quantity of resource blocks; and
transmit the TRS in the slot based at least in part on the TRS pattern.

26. The base station of claim 25, wherein the TRS includes at least three TRS symbols.

27. The base station of claim 25, wherein the TRS pattern is one of a plurality of configured TRS patterns, the plurality of configured TRS patterns including a first TRS pattern and a second TRS pattern,
a frequency density of TRS symbols in the first TRS pattern of being different than a frequency density of TRS symbols in the second TRS pattern,
a time density of the TRS symbols of the first TRS pattern being different than a time density of the TRS symbols in the second TRS pattern, and
the TRS pattern being either the first TRS pattern or the second TRS pattern.

28. A base station for wireless communication, comprising:
one or more memories storing processor-executable code; and
one or more processors coupled with the one or more memories and individually or collectively configured to, when executing the code, cause the base station to:
determine a tracking reference signal (TRS) pattern that is to be used for transmitting a TRS within a slot, the TRS pattern being one of a plurality of configured TRS patterns, a frequency density of TRS symbols in a first TRS pattern of the plurality of configured TRS patterns being less than a frequency density of TRS symbols in a second TRS pattern of the plurality of configured TRS patterns, a time density of the TRS symbols of the first TRS pattern being greater than a time density of the TRS symbols in the second TRS pattern, the TRS pattern being either the first TRS pattern or the second TRS pattern, the TRS pattern indicating:
   a plurality of TRS symbols of the TRS within the slot,
   a first quantity of resource blocks allocated in a first TRS symbol in the slot, and
   a second quantity of resource blocks allocated in a second TRS symbol in the slot, the first quantity of resource blocks being different than the second quantity of resource blocks; and
transmit the TRS in the slot based at least in part on the TRS pattern.

29. The base station of claim 28, wherein one or more TRS symbols of the plurality of TRS symbols have a bandwidth that is different than a bandwidth of at least one other TRS symbol of the plurality of TRS symbols.

30. The base station of claim 28, wherein one or more TRS symbols of the plurality of TRS symbols have a discontinuous tone allocation.

* * * * *